(12) United States Patent
Wawrzyniak

(10) Patent No.: US 7,509,720 B2
(45) Date of Patent: Mar. 31, 2009

(54) CONTINUOUS TOOL ROTATION TOOL TURRET

(76) Inventor: Walter W. Wawrzyniak, 25770 Groesbeck Hwy., Warren, MI (US) 48089

( * ) Notice: Subject to any disclaimer, the term of this patent is extended or adjusted under 35 U.S.C. 154(b) by 0 days.

(21) Appl. No.: 11/935,388

(22) Filed: Nov. 5, 2007

(65) Prior Publication Data

US 2008/0060182 A1 Mar. 13, 2008

(51) Int. Cl.
*B23B 29/32* (2006.01)
(52) U.S. Cl. .............................. 29/40; 29/42; 74/813 R; 408/35; 83/552
(58) Field of Classification Search .................. 29/33 J, 29/35.5, 39, 40, 42; 408/35; 74/813 R; 83/552; 144/48.1; 82/120, 121, 159; *B23B 29/32*
See application file for complete search history.

(56) References Cited

U.S. PATENT DOCUMENTS

| 431,108 | A | | 7/1890 | Cowley | |
|---|---|---|---|---|---|
| 1,306,467 | A | * | 6/1919 | Coughtry | 408/35 |
| 1,536,730 | A | * | 5/1925 | Sears | 408/52 |
| 1,846,391 | A | * | 2/1932 | Hallenbeck | 408/11 |
| 2,364,631 | A | | 12/1944 | Grimes | |
| 2,682,698 | A | | 7/1954 | Berthiez | |
| 2,697,611 | A | * | 12/1954 | Glasser | 279/6 |
| 2,697,952 | A | * | 12/1954 | Otto | 408/34 |
| 3,014,385 | A | * | 12/1961 | Shaw | 408/35 |
| 3,199,169 | A | * | 8/1965 | Weber | 408/25 |
| 3,385,143 | A | * | 5/1968 | Walk | 82/137 |
| 3,598,495 | A | * | 8/1971 | Cupler, II | 408/35 |
| 3,694,875 | A | * | 10/1972 | Zimmermann | 29/42 |
| 3,760,472 | A | * | 9/1973 | Kielma et al. | 29/40 |
| 3,955,687 | A | | 5/1976 | Flisch | |
| 4,297,925 | A | * | 11/1981 | Ishizuka et al. | 82/120 |
| 4,527,458 | A | | 7/1985 | Johnson | |
| 4,602,874 | A | | 7/1986 | Neugebauer | |
| 4,610,584 | A | | 9/1986 | Malzkorn et al. | |
| 4,656,708 | A | | 4/1987 | Smith et al. | |
| 4,741,078 | A | | 5/1988 | Kimura | |
| 4,819,311 | A | | 4/1989 | Hashimoto | |
| 4,847,960 | A | | 7/1989 | Hafla et al. | |
| 4,872,244 | A | * | 10/1989 | Schleich | 29/40 |
| 4,887,345 | A | * | 12/1989 | Saito et al. | 483/39 |
| 5,146,663 | A | | 9/1992 | Buessinger | |
| 5,170,678 | A | | 12/1992 | Wawrzyniak et al. | |
| 5,383,261 | A | | 1/1995 | Yamamoto et al. | |
| 5,452,503 | A | | 9/1995 | Yamamoto | |
| 5,490,307 | A | | 2/1996 | Link | |

(Continued)

*Primary Examiner*—David P Bryant
*Assistant Examiner*—Eric A Gates
(74) *Attorney, Agent, or Firm*—Gregory T. Zalecki

(57) ABSTRACT

A continuous tool rotation tool turret is comprised of a turret head, a plurality of spindles and a motor. The spindles are attached to the turret head. Each spindle is adapted to secure and rotate a cutting tool. The motor simultaneously rotates each spindle. The spindles rotate at an operational speed while the turret head is being indexed. A bevel gear operationally connected to the motor simultaneously rotates a bevel gear attached to each spindle. Air pressure separates the turret head from its rest surface during indexing. The turret head rotates around a manifold which supplies coolant and pressurized air to the turret head. Optionally, a mating wedge and wedge receptacle attached to the turret head and its housing provide for more precise indexing of the turret head. The continuous tool rotation minimizes the time needed to index the turret from one position to another.

8 Claims, 21 Drawing Sheets

U.S. PATENT DOCUMENTS

| | | |
|---|---|---|
| 6,050,756 A | 4/2000 | Bucholz et al. |
| 6,640,404 B2 * | 11/2003 | Sheehan et al. ................ 29/40 |
| 6,729,813 B2 | 5/2004 | Sahm et al. |
| 6,785,943 B2 | 9/2004 | Sheehan et al. |

* cited by examiner

CONTINUOUS TOOL ROTATION TOOL TURRET

BACKGROUND

Many automated machine tools use indexing tool turrets for machining work pieces. The tool turrets contain a plurality of cutting tools. The cutting tools are positioned upon the tool turret such that only one tool is in an operational position at a time. The remaining tools do not interfere with the machining operation. After a machining operation (or operations) is performed by the first tool, the tool turret is rotated or indexed to bring a second cutting tool into an operational position. The objective is to perform a series of machining operations upon a workpiece with a plurality of cutting tools in a minimal time period. In prior art tool turrets only the operational cutting tool rotates. The cutting tools on the tool turret which are not involved in that machining operation do not rotate. Thus, one of the steps involved in indexing the tool turret from one position to another involves stopping rotation of the operational cutting tool, indexing the second cutting tool into an operational position and bringing the second cutting tool up to an operating rotational speed. One of the objectives of an automated machine tool using a tool turret is to produce machined finished work pieces as quickly as possible with minimal wear and tear upon the machine parts. A significant time delay accompanies prior art tool turrets because of the time needed to start and stop the cutting tools between tool turret indexings. Additionally, the starting and stopping of the cutting tools causes unnecessary wear and tear upon the machine parts. What is needed is a tool turret having a plurality of spindles attached to cutting tools wherein the tools continuously rotate and thereby avoid the rotation start and rotation stop time delays. Also needed is a tool turret with minimal friction between the tool turret and the surface upon which it rests. This will provide for more precise positioning of the tool turret, the need for less energy to rotate the tool turret and less wear upon the tool turret and the surface upon which it rests. Additional desirable features of an improved tool turret include the supplying of coolant and pressurized air to the tool turret and more precise positioning of the tool turret. The coolant will allow turret spindles to rotate at a higher speed and lower temperature with less wear. The pressurized air can be used to prevent contaminants from entering areas between moving parts of the tool turret and to remove contaminants which have entered such areas. The continuous tool rotation tool turret described herein meets these needs.

SUMMARY

The simplest embodiment of a continuous tool rotation tool turret is comprised of a turret head, a plurality of spindles and a motor. The turret head has an axis of rotation about which the turret head rotates. Each spindle is attached to the turret head. Each spindle is adapted to secure and rotate a cutting tool. The motor is adapted to simultaneously rotate each spindle. The spindles are adapted to rotate at an operational speed while the turret head is being indexed. The spindles are sized, positioned and angled with respect to the axis of rotation of the turret head and the turret head such that only one spindle may be in a work position at a time. The preferred angle between the axis of rotation of each spindle and the axis of rotation of the turret head is about 45°.

In a second improved embodiment, the turret head rests upon a slant surface provided by a housing. The turret head is rotatable upon the slant surface. The housing also provides a receptacle within which a portion of the turret head is rotatably seated. A post is attached to the housing. The post is perpendicularly oriented with respect to the slant surface. The turret head rotatably rests upon the slant surface and partially within the receptacle of the housing such that the turret head has an axis of rotation about which it rotates for indexing on the slant surface. A fastener attached to the post clamps the turret head to the slant surface. Preferably, the slant surface has one or more air grooves. Each of the air grooves are connectable to a pressurized air source. The grooves are open at the surface of the slant surface. This permits the pressurized air to provide a force which tends to unclamp the turret head from the slant surface of the housing.

The best mode of implementing continuous tool rotation involves the use of bevel gears. A drive bevel gear is adapted to rotate about the axis of the post. Each spindle has an input gear. This input gear is a driven bevel gear. The motor is operationally connected to the drive bevel gear such that it causes rotation of the drive bevel gear about the axis of the post. The drive bevel gear is engaged with each of the input driven bevel gears of the spindles. This provides for simultaneous rotation of all spindles. The spindles and gears are adapted such that the spindles rotate at an operational speed while the turret head is being indexed. The operational speed of the spindles can be controlled by the selection of appropriate bevel gear teeth ratios and motor rotational speed.

A manifold may be used to supply coolant and pressurized air to the turret head. In this case the post has a supply coolant passage, a return coolant passage and an air passage. The supply coolant passage is connected at one end to the manifold and at the other end to a coolant inlet for supplying coolant to the manifold. The return coolant passage is connected at one end to the manifold and at the other end to a coolant outlet for receiving coolant from the manifold. The air passage is connected at one end to the manifold and at the other end to an air inlet for supplying pressurized air to the manifold. The manifold is attached to the post. The manifold has a plurality of annular grooves along its periphery. A first groove is connected to the supply coolant passage of the post and is adapted to supply coolant to the turret head. A second groove is connected to the return coolant passage of the post and is adapted to return coolant from the turret head. A third groove is connected to the air passage of the post and is adapted to supply pressurized air to the turret head. The manifold is shaped to permit rotation of the turret head about its periphery. The turret head is adapted to receive supply coolant from the manifold, to receive pressurized air from the manifold and to return return coolant to the manifold. Return coolant is coolant that has previously been delivered to the turret head through the supply coolant passage and, after absorbing heat, is carried away from the turret head.

A servo motor is used to index the turret head into a desired operational position. The servo motor has an output shaft with a pinion gear. This pinion gear is engaged with a ring gear attached to the turret head. Rotation of the pinion gear repositions the turret head by causing rotation of the ring gear. Optionally, a wedge locator system may be used for more precise indexing of the turret head. The wedge locator system is comprised of a plurality of first wedge locator members, an actuator and a second wedge locator member. The first wedge locator members are attached to the turret head. The actuator is adapted for extension and retraction of a wedge locator member. An air cylinder may be used as an actuator. The second wedge locator member is attached to the actuator. The first wedge locator members and the second wedge locator member are shaped to fit together as a wedge and a wedge receptacle. Although the first wedge locator members are preferably shaped as wedges and the second wedge locator member is preferably shaped as a wedge receptacle, these shape assignments can be transposed. The actuator is fixedly positioned with respect to the turret head. The position of the actuator with respect to the turret head, the position of each first wedge locator member upon the turret head and the position of the second wedge locator member with respect to the actuator are set such that a preselected indexed position of the turret head results from the engagement of the second wedge locator member with a first wedge locator member.

The preferred embodiment of a continuous tool rotation tool turret which indexes on a slant surface is comprised of a turret head, a housing, a manifold, a manifold and clamp post, a plurality of spindle assemblies, a drive bevel gear and a motor. The housing provides a slant surface upon which the turret head rotatably rests and a receptacle within which a portion of the turret head is rotatably seated. The manifold and clamp post is attached to the housing such that the post is perpendicularly oriented with respect to the slant surface. The post has a supply coolant passage connected at one end to the manifold and at the other end to a coolant inlet for supplying coolant to the manifold. The post has a return coolant passage connected at one end to the manifold and at the other end to a coolant outlet for receiving coolant from the manifold. The post also has an air passage connected at one end to the manifold and at the other end to an air inlet for supplying pressurized air to the manifold. The manifold end of the post is adapted to receive a fastener for clamping the turret head to the slant surface. The end of the post may be threaded and the fastener may be a nut which fits the threads. The manifold is attached to the post. The manifold has a plurality of annular grooves along its periphery. A first groove is connected to the supply coolant passage of the post and is adapted to supply coolant to the turret head. A second groove is connected to the return coolant passage of the post and is adapted to return coolant from the turret head. A third groove is connected to the air passage of the post and is adapted to supply pressurized air to the turret head. The manifold should be provided with O-rings above and below the grooves for preventing leakage of coolant or air. The manifold is shaped to permit rotation of the turret head about the periphery of the manifold. A cylindrically shaped manifold may be used.

The turret head rotatably rests upon the slant surface of the housing such that the turret head has an axis of rotation about which it rotates for indexing on the slant surface. A portion of the turret head should be rotatably seated within the receptacle of the housing. The turret head is clamped to the slant surface by a fastener engaged with the manifold end of the post. In the preferred embodiment the fastener is a nut engaged with threads on the post. The nut is torqued such that it causes a desired clamping force between the turret head and the slant surface. The turret head is adapted to receive coolant from the manifold, to receive pressurized air from the manifold and to return return coolant to the manifold. The turret head may be provided with holes to receive and transmit these fluids.

The slant surface of the housing has one or more air grooves. Each of the air grooves are connectable to a pressurized air source and are open at the surface of the slant surface for providing a force which tends to unclamp the turret head from the slant surface of the housing. Preferably, the air grooves are segmented such that they are isolated from each other. This provides an unclamping force which is more evenly balanced about the portion of the turret head which rests upon the slant surface. The use of segmented air grooves also permits the use of a slant surface and a mating surface on the turret head which have flatness imperfections.

The spindle assemblies are attached to the turret head. Each spindle assembly is comprised of a spindle housing, a spindle, a toolholder and an input driven bevel gear. Each toolholder is adapted to secure a tool and is attached to a spindle. An input driven bevel gear is attached to each spindle for rotatably driving that spindle. Each spindle assembly is adapted to secure and rotate a cutting tool. Each spindle housing has a cooling jacket which is adapted to receive supply coolant from the manifold and to return return coolant to the manifold for cooling the spindle assembly.

The drive bevel gear is adapted to rotate about the axis of the post. The spindle motor is operationally connected to the drive bevel gear for rotating the drive bevel gear about the axis of the post. The drive bevel gear is engaged with each input driven bevel gear. This provides for simultaneous rotation of all spindles. The spindles and gears are adapted such that the spindles rotate at an operational speed while the turret head is being indexed. Each spindle has an axis of rotation about which a tool secured to the spindle rotates. The angle between the axis of rotation of each spindle and the axis of rotation of the turret head is less than 90°. Preferably, it is about 45°. The spindles are sized, positioned and angled with respect to the axis of rotation of the turret head and the turret head such that only one spindle may be in a work position at a time. A spindle is in a work position when it is indexed relative to the housing (e.g. the bottom spindle of FIG. 1) into a position for the performance of a machining operation upon the workpiece.

The preferred embodiment of the continuous tool rotation tool turret which indexes on a slant surface is equipped with a wedge locator system, as previously described.

This invention also includes a method for machining a workpiece with a tool turret having a plurality of cutting tools. In its simplest form, a machining operation is performed upon the workpiece with a first cutting tool. The first cutting tool is then backed away from the workpiece. A second cutting tool on the tool turret is rotated into an operational position while the first cutting tool continues to rotate at an operational speed. Preferably, all of the cutting tools on the tool turret continue to rotate at an operational speed. A machining operation is performed upon the workpiece with the second cutting tool. The time required to index the tool turret from one position to another is reduced because delays caused by starting and stopping the cutting tools are not encountered.

Additionally, this invention encompasses an indexable table comprised of a housing, a post and a table. The housing provides a support surface for the table. The housing has an axis of rotation for the table. The post is fixed to the housing. It extends perpendicularly from the support surface along the axis of rotation. The table is positioned upon the support surface such that it rotates about the post. The table is mechanically clamped to the support surface. The table may be mechanically clamped to the support surface by tightening a nut which is in contact with the table and which is also threaded onto the post. The support surface is adapted to receive pressurized air. The support surface is also adapted to direct the pressurized air to the interface between the table and the support surface such that the pressurized air unclamps the table from the support surface. This will permit the low friction rotation of the table about the axis of rotation of the support surface. Low friction rotation of the table permits the use of a lower degree of torque to rotate the table. The pressurized air is directed to the interface between the table and the support surface by one or more inner grooves within the support surface. The air grooves are open at the table interface surface of the support surface. Preferably, the air grooves are segmented for the reasons described herein.

DRAWINGS

These and other features, aspects, and advantages of the present invention will become better understood with regard to the following description, appended claims, and accompanying drawings where:

DESCRIPTION

Figure 1:
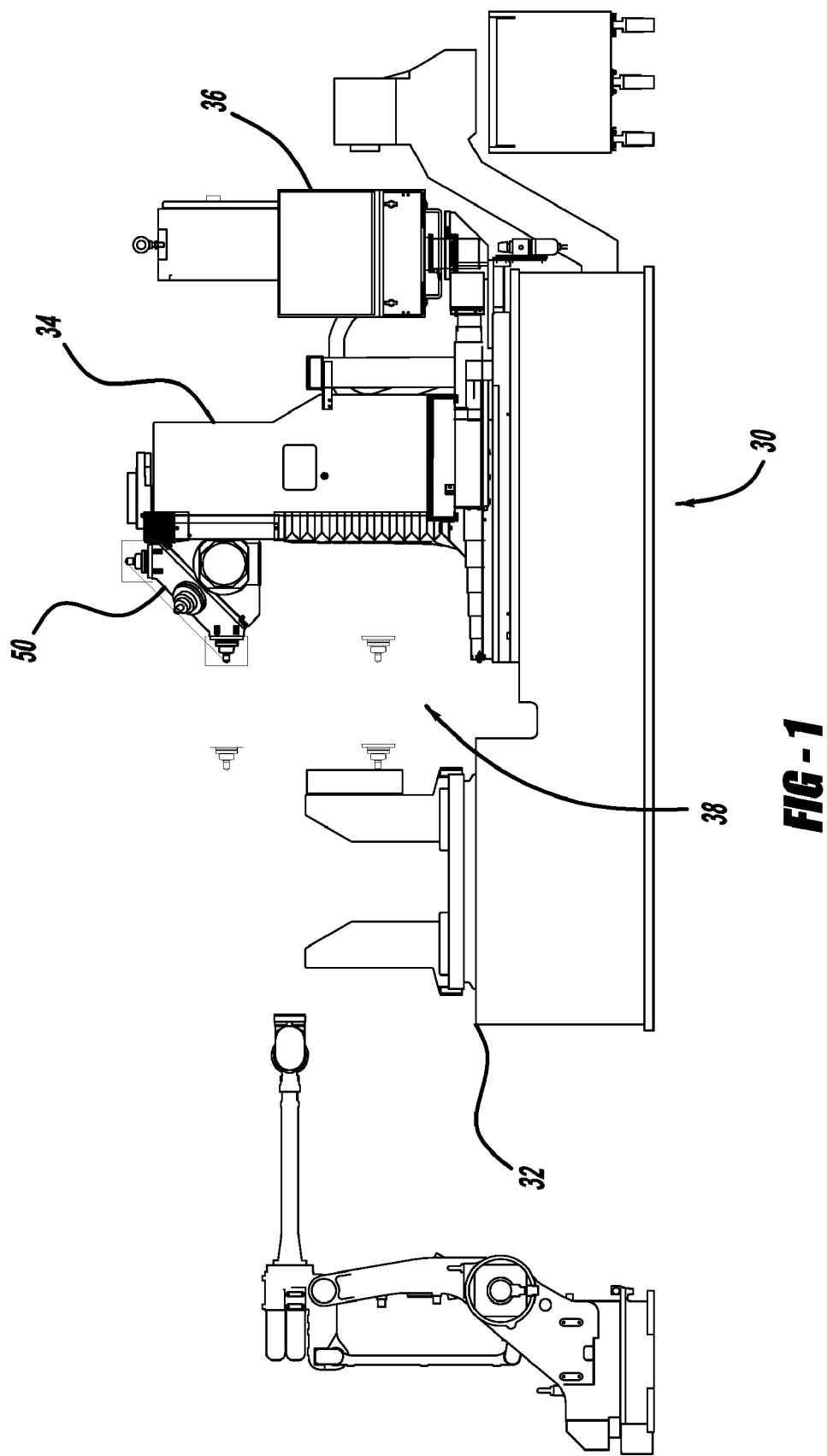
FIG. 1 is a side view of an automated machine tool using a continuous tool rotation tool turret.

The preferred use of the continuous tool rotation (during index) tool turret 50 is in conjunction with an automated machine tool 30 incorporating an index table assembly as described in my U.S. Pat. No. 5,170,678. This patent is incorporated herein by reference. The phrase continuous tool rotation, as used herein, means that the tool 98 rotates at a substantially constant operational speed irrespective of whether or not the turret 50 upon which the tool 98 is mounted is rotating upon the housing 52 upon which it rests, is stationary with respect to the housing 52, or whether the tool 98 is about to perform a machining operation upon a workpiece. Rotation of the tool turret 50 into an operational position is also known as indexing. Thus, the term indexing of the tool turret 50 and the phrase rotation of the tool turret 50 into an operational position are synonymous, as used herein. A typical application is illustrated within FIG. 3. There, an operator is shown attending to the operation of an automated machine tool 30. The automated machine tool 30 has five workstations 38. A machining operation such as drilling, milling, reaming, tapping or boring may be performed at each station 38. A workpiece to be machined is secured to the index table 32. The workpiece is sequentially moved from one station 38 to another by rotation of the index table 32. At each station 38 one or more machining operations are performed. The machining operations are performed by rotating tools 98 attached to spindles 92 contained within a continuous tool rotation turret 50. At each station 38 a desired tool 98 is brought into a work position by rotation of the continuous tool rotation tool turret 50. The continuous tool rotation tool turret 50 is attached to a three axis CNC slide 34. The three axis CNC slide 34 controls and facilitates movement of the continuous tool rotation tool turret 50 along three axes. Thus, a rotating cutting tool 98 may be precisely positioned with respect to the workpiece and the depth and contour of the cut performed by the tool 98 may be precisely controlled. The depth and contour of the cut are controlled by the movement of the three axis CNC slide 34. The timing and movement of the three axis CNC slide 34 is programmably controlled. A programmer programs a program module 36 to define the timing and geometry of desired machining operations. After one set of machining operations are performed at a station 38 by one cutting tool 98, the continuous tool rotation tool turret 50 is backed away from the workpiece and rotated/indexed so that another cutting tool 98 is in a work position. This cutting tool 98 is then used to perform one or more machining operations. This process continues until all machining operations to be performed by the tools 98 attached to the continuous tool rotation tool turret 50 at that station are completed Once all machining operations are performed at a given station 38 the index table 32 is rotated to move the workpiece to another station 38. At that station 38 another series of machining operations are performed. The process of machining at each station 38 and rotating the workpiece on the index table 32 to the next station 38 is repeated until all desired machining operations are completed.

One of the objectives of this invention is to incorporate a means of rotating all spindles 92 simultaneously using a single spindle motor 110. A separate servo motor 80 is adapted to index the tool turret 50 into a plurality of controlled positions while the tools 98 are rotating. This continuous tool rotation minimizes the time needed to complete an entire series of machining operations upon a workpiece. Prior art automated machine tools do employ the concept of sequentially rotating a plurality of tools attached to a tool turret into a work position for the performance of one or more machining operations. However, the tool rotation is stopped and a clutch is disengaged before the tool turret is rotated/indexed. Thus, a tool is brought into a work position, the clutch is engaged and then the tool is brought from a stationary state up to an operational rotation speed. Before the next tool is brought into a work position, the rotation of the first tool is stopped and the clutch is disengaged. This process of starting and stopping the tool rotation and engaging and disengaging a clutch before each rotation (indexing) of the tool turret has several drawbacks. The starting and stopping of the tool rotation and engaging and disengaging the clutch involves considerable time delay. During this time delay no machining operations are being performed and the tool turret is not being rotated (indexed). As a result the automated machine tool is not being used at maximum production efficiency. Additionally, the starting and stopping of the tool rotation places considerable mechanical stress upon the components of the tool turret and its rotatable tools. This mechanical stress causes early machine failure and causes a need for frequent machine maintenance. Prior art automated machine tools with automatic tool changers also have to stop the spindle, move into a tool change position, change the tools, and return to a work position using more time and reducing the efficiency of the machine. This invention minimizes the time needed to complete an entire series of machining operations upon a workpiece by employing the use of continuously rotating tools 98. The tools 98 continue to rotate while the continuous tool rotation tool turret 50 rotates or indexes from one position to another and while the index table 32 rotates the workpiece from one station 38 to another.

Figure 5:
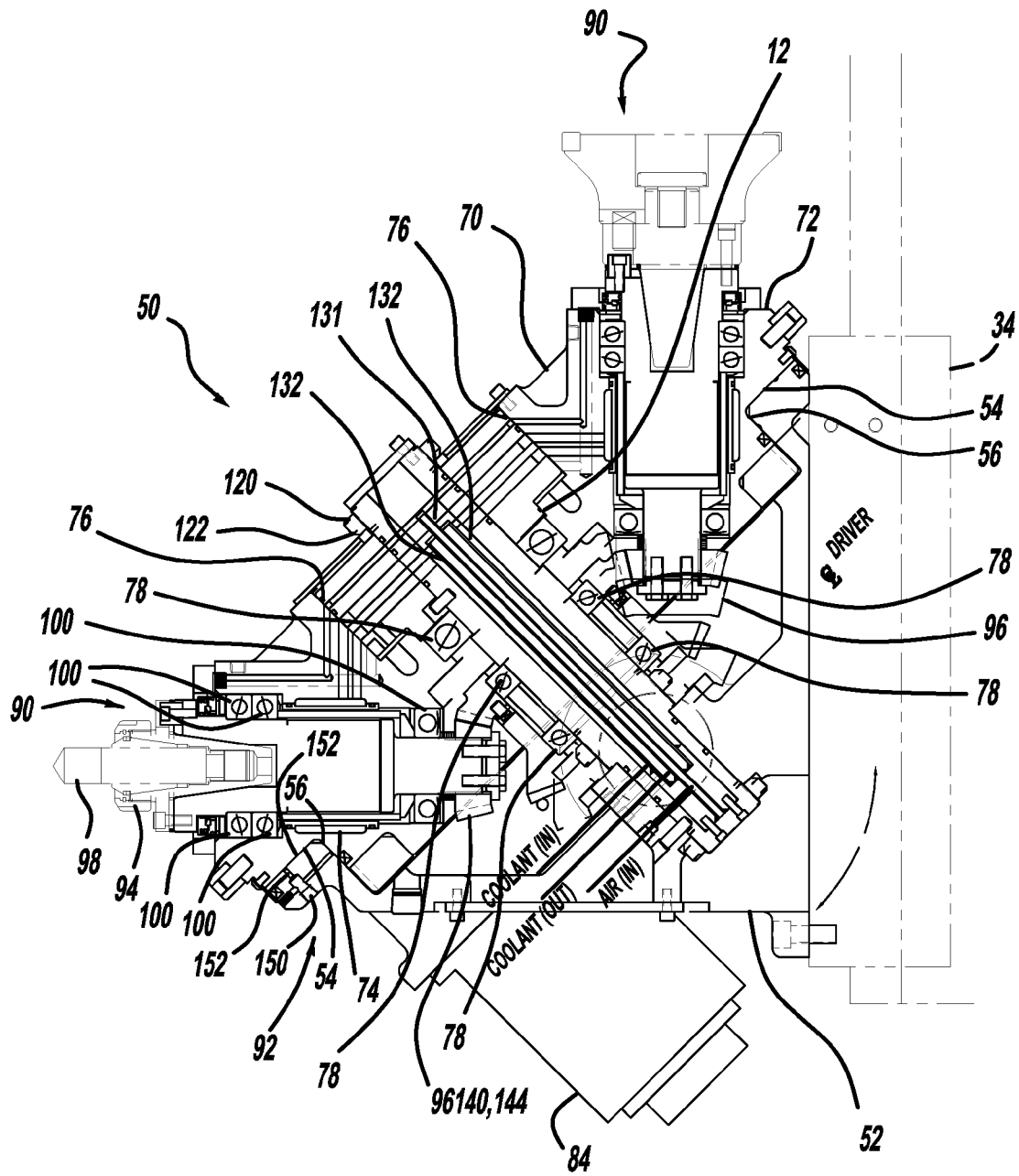
FIG. 5 is a side elevation sectional view of a continuous tool rotation tool turret.
Figure 11:
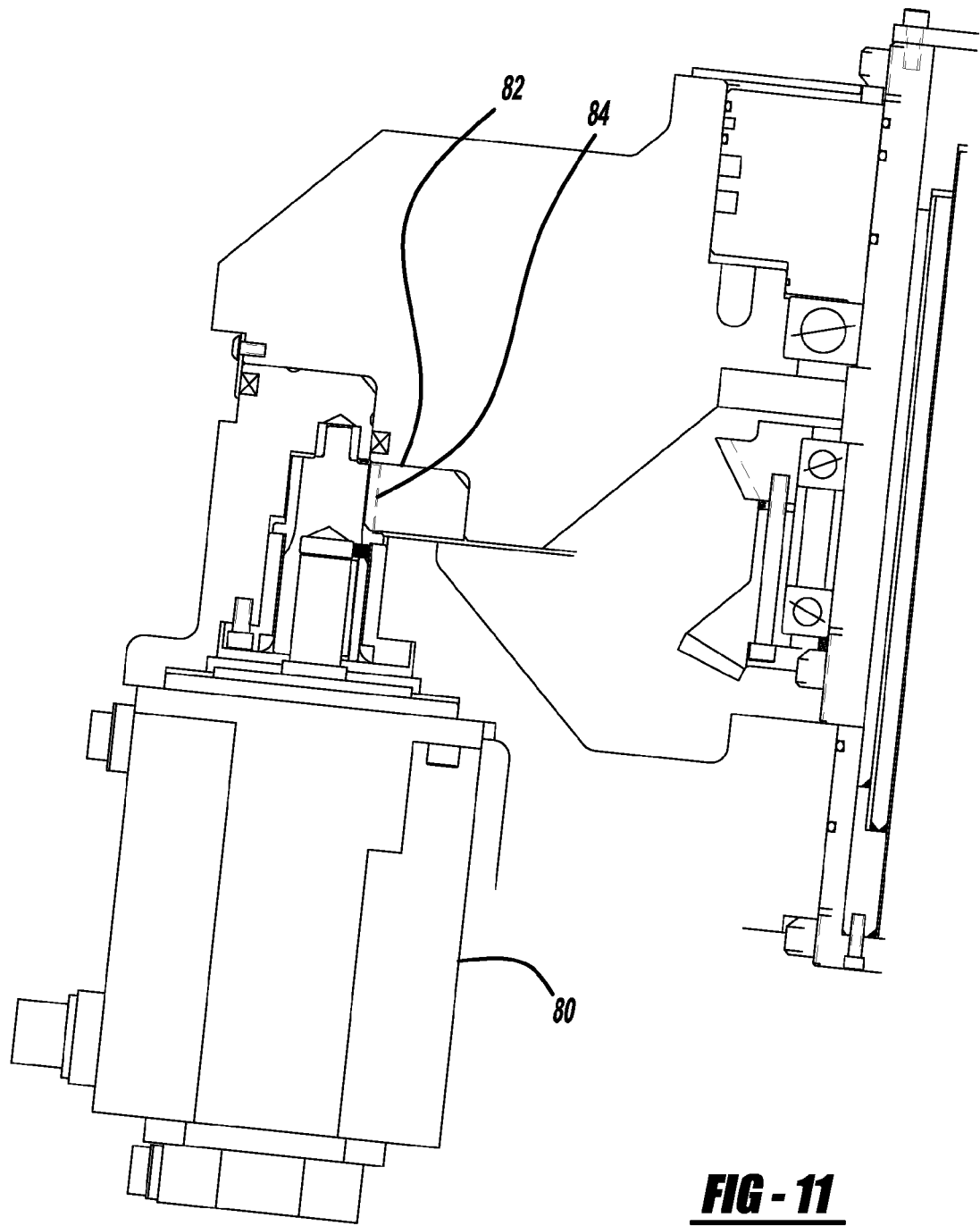
FIG. 11 is a side elevation view of the servo motor, pinion gear and ring gear of a continuous tool rotation tool turret.

The preferred embodiment of a continuous tool rotation tool turret 50 is comprised of a housing 52, a turret head 70, a plurality of spindle assemblies 90 and a motor 110 for rotating the spindles 92 within the spindle assemblies 90. A separate servo motor 80 is adapted to rotate/index the turret head 70, as shown in FIG. 11. The output shaft of the servo motor 80 is attached to a pinion gear 84. A ring gear 82 is attached to the turret head 70. The ring gear 82 and the pinion gear 84 are positioned such that they mesh and such that rotation of the pinion gear 84 rotates the ring gear 82 and indexes the turret head 70 into a preselected position. The use of a single motor to rotate the spindles 92 and to index the turret head 70 is also within the scope of this invention. The continuous tool rotation tool turret 50 may be provided with or without a housing 52. However, it will generally be used in conjunction with a housing 52. The housing 52 is adapted to be attached to a three axis CNC slide 34. For example, the housing 52 may be adapted to be bolted to a three axis CNC slide 34. The housing 52 has a slant surface 54 upon which the turret head 70 rests. The slant (rest) surface 54 is generally flat. The turret head 70 rests upon the slant (rest) surface 54. The slant of the slant (rest) surface 54 is shown in FIG. 5. That figure illustrates a tool 98 and spindle 92 in a work position. The rotational axis of the tool 98 and spindle 92 is depicted horizontally. The slant surface 54 of the housing 52 is slanted with respect to the rotational axis of the tool 98 and spindle 92 which are in a work position, as shown in FIG. 5. The slant of the slant (rest) surface 54 permits one tool 98 and spindle 92 to be in a work position while the remaining rotating tools 98 and rotating spindles 92 attached to the turret head do not interfere with the workpiece.

The turret head 70 is fabricated as a solid casting. Preferably, it is cast from aluminum. The preferred diameter of the turret head 70 is 20.5 inches, as measured at the part of the turret head 70 which sits upon the slant surface 54 of the housing 52. As shown in FIG. 5, the turret head 70 has a plurality of spindle housings 72. Each spindle housing 72 is in the shape of a hollow cylinder extending from the turret head 70. The turret head 70 also has a manifold and clamp post opening 76. The turret head 70 rotates or indexes around a manifold and clamp post 120. The manifold and clamp post 120 extends through the turret head 70. The manifold and clamp post 120 is fixed to the housing 52. The longitudinal axis of the manifold and clamp post 120 defines an axis about which the turret head 70 rotates or indexes. Rotation of the turret head 70 around the manifold and clamp post 120 is facilitated by bearings 78 positioned at the interface between the turret head 70 and the manifold and clamp post 120, as shown in FIG. 5. As previously described, the turret head 70 is provided with a ring gear 82. A servo motor 80 drives the ring gear 82 and hence rotates the turret head 70 by way of a pinion gear 84, as shown in FIG. 11. The servo motor 80 provides position and index speed data feedback to the program module 36.

The manifold and clamp post 120 is provided with a manifold 121 at one end (the end distal to the slant surface 54 of the housing 52 and proximal to the spindle housings 72, as shown in FIG. 5). The manifold 121 is fixed with respect to the manifold and clamp post 120. The turret head 70 is adapted to rotate around the manifold clamp post 120 and the manifold 121. The manifold and clamp post 120 and the manifold 121 supply coolant and pressurized air to the turret head 70 and the spindle assemblies 90. They also provide a means of clamping the turret head 72 to the slant (rest) surface 54 through an adjustable nut 122. In the preferred embodiment the adjustable nut 122 is tightened such that approximately 2000 pounds of clamping force exists between the turret head 70 and the slant surface 54. In an alternate embodiment the adjustable nut 122 sits on top of a bevel washer. The bevel washer acts as a spring. As it is compressed, its length along the longitudinal axis of the post 120 shortens and a higher clamping force is exerted upon the turret head 70. The bevel washer can be distinguished from a flat washer by its semi conical shape. While a flat washer remains in a single plane, the semi conical surface of a bevel washer rises above the plane, thus making it ideal for use as a pseudo spring. Under air pressure to the slant rest surface 54 the turret head 70 becomes a piston and offsets the clamp preload force, unclamps, and the air is an air lubricant allowing the low friction indexing of the turret head 70.

Figure 21:
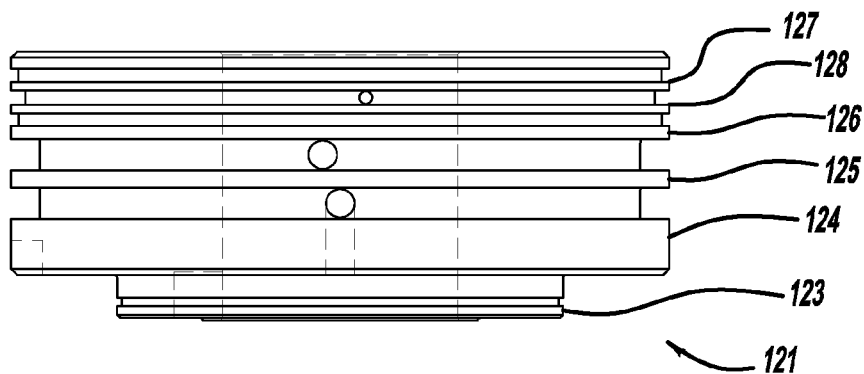
FIG. 21 is a side elevation view of the manifold of a continuous tool rotation tool turret.
Figure 23:
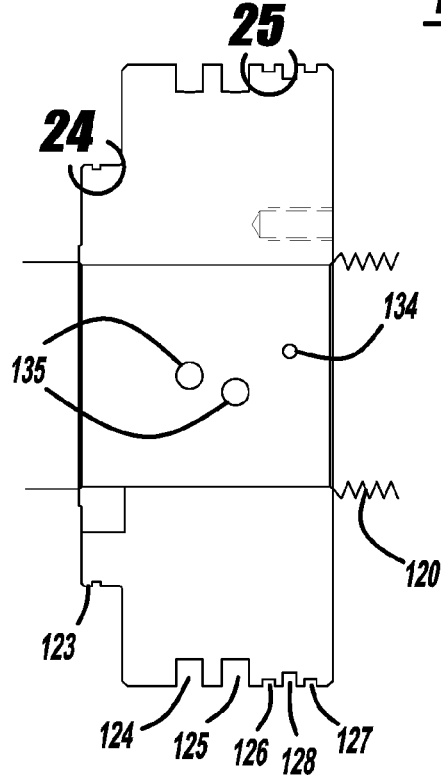
FIG. 23 is a side elevation sectional view of the manifold of FIG. 21.
Figure 22:
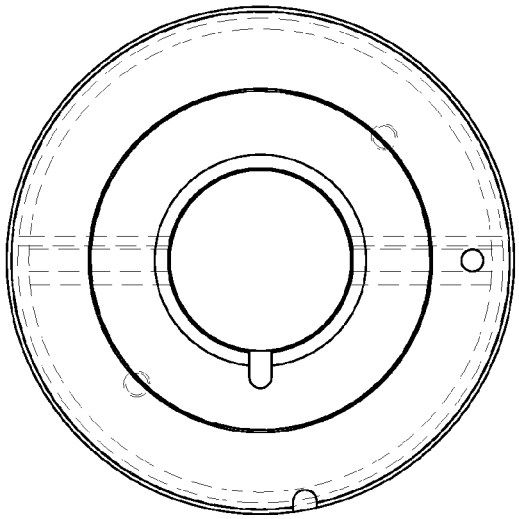
FIG. 22 is a bottom view of the manifold of FIG. 21.
Figure 24:
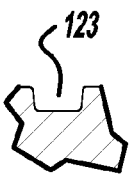
FIG. 24 is an enlarged view of the first O-ring groove of the manifold of FIG. 21.
Figure 25:
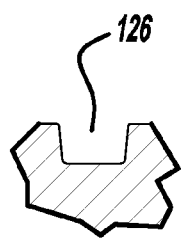
FIG. 25 is an enlarged view of the second O-ring groove of the manifold of FIG. 21.
Figure 26:
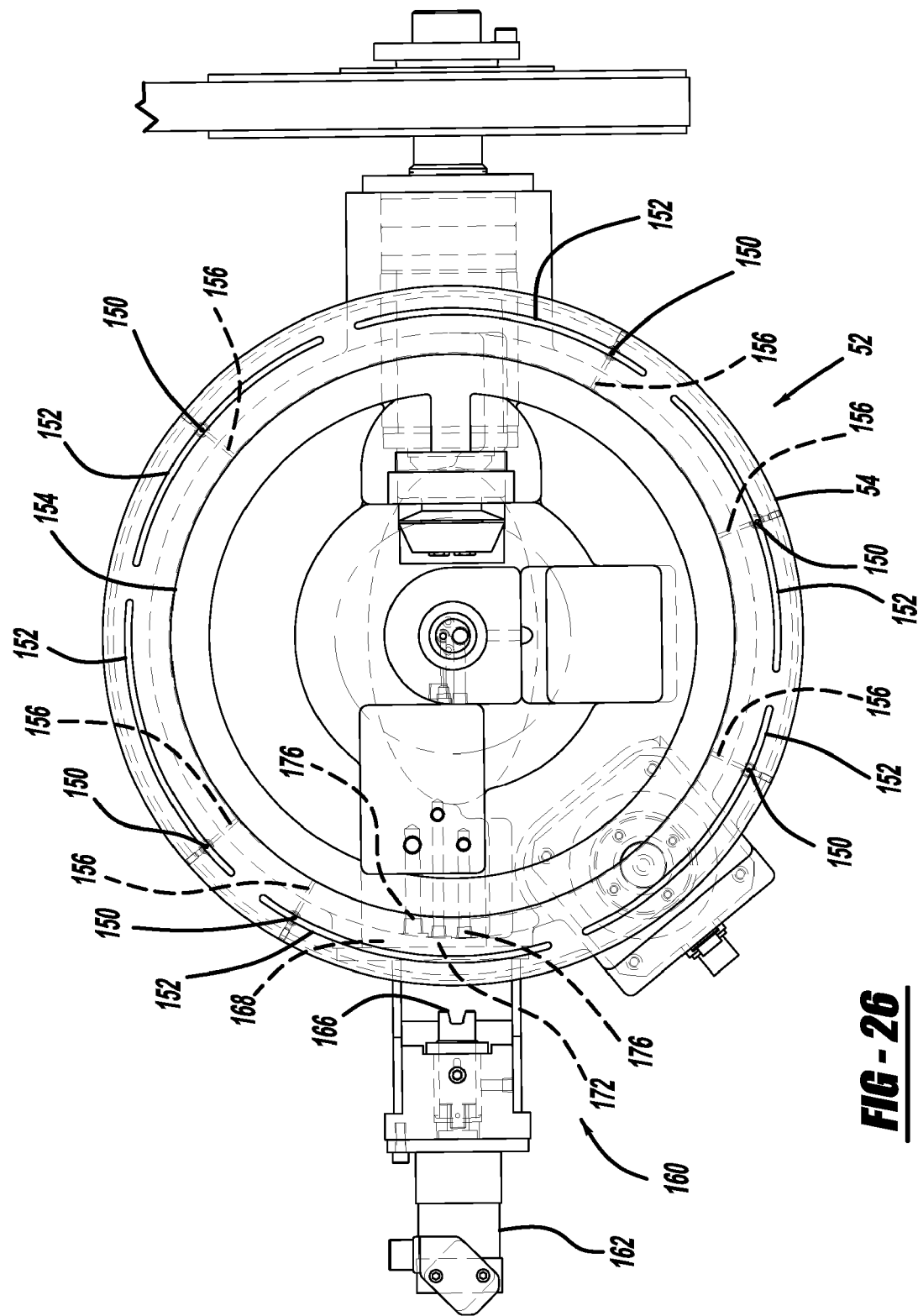
FIG. 26 is a top view of the slant surface of a housing of a continuous tool rotation tool turret showing segmented air grooves, a wedge locator system and an alternate drive mechanism for rotating the post gear.
Figure 27:
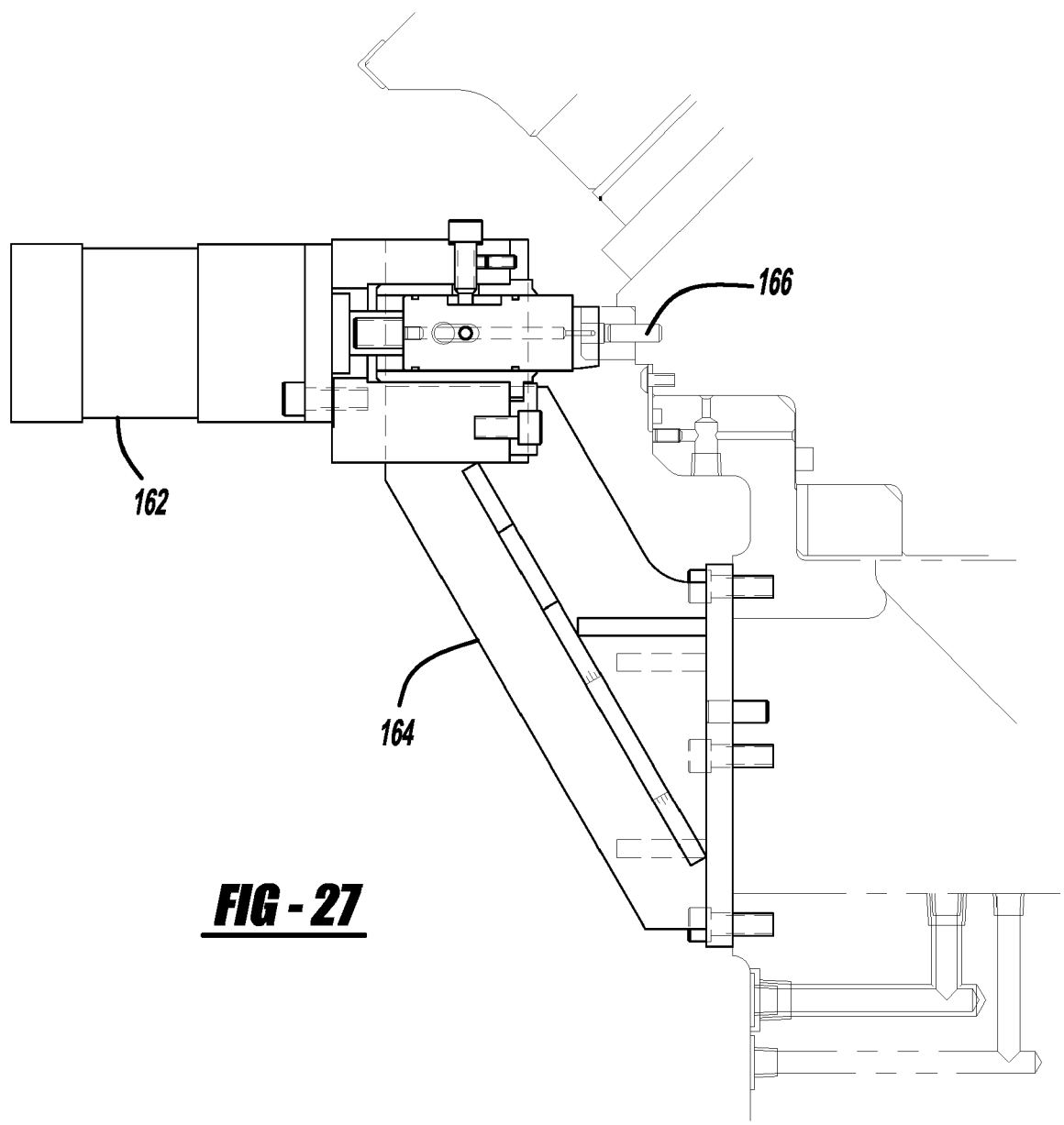
FIG. 27 is a side elevation view of the wedge locator system of FIG. 14.
Figure 28:
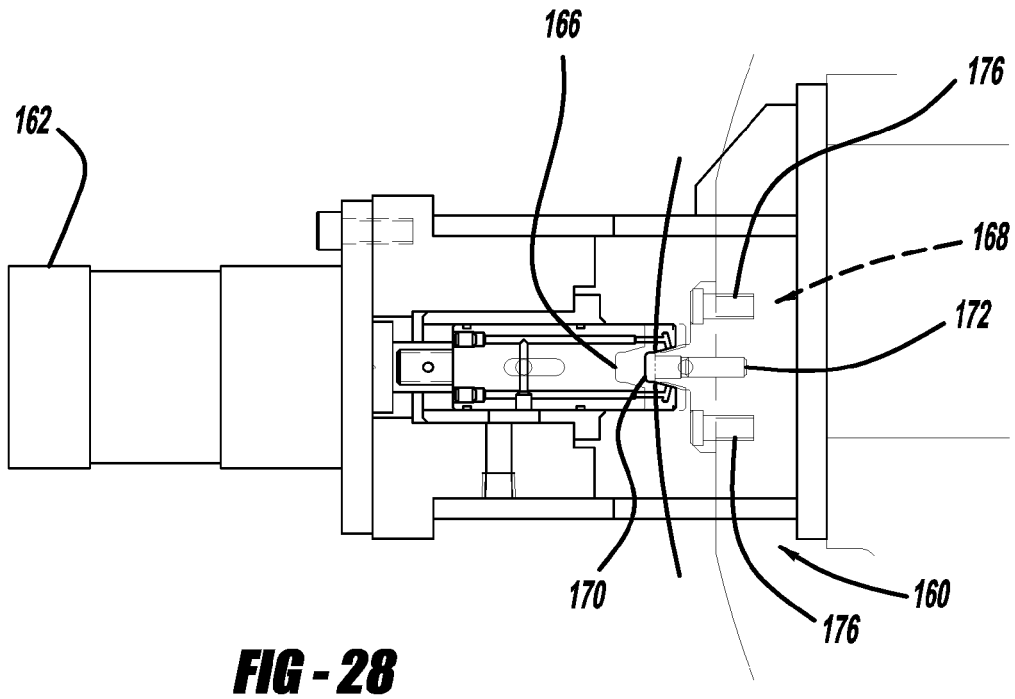
FIG. 28 is a top plan view of the wedge locator system of FIG. 14.
Figure 29:
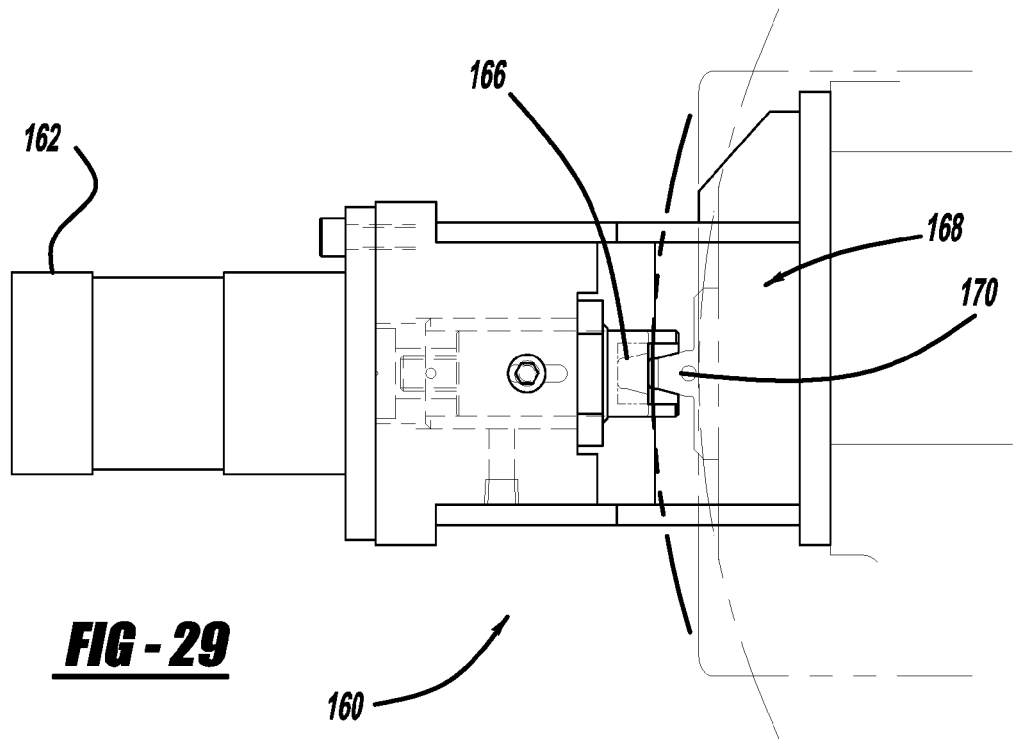
FIG. 29 is a top plan view of the wedge locator system of FIG. 14.

The manifold 121 is cylindrical in shape. The cylindrical shape of the manifold 121 matches a cylindrical opening within the turret head 70 such that the turret head 70 may rotate around the manifold 12, but side to side movement of the turret head 70 relative to the longitudinal axis of the manifold 121 is prevented. The manifold 121 is provided with a plurality of annular grooves for supplying coolant and air to the turret head 70 and for receiving O-rings, as shown in FIG. 21 and FIG. 23. The O-rings are adapted to prevent air and coolant leakage outside of the turret head 70—manifold 121 interface. The position of the grooves from bottom to top (top being the end distal to the slant surface 54 of the housing 52) is as follows. A first O-ring groove 123 is adapted to receive an O-ring for coolant sealing. A first coolant groove 124 and a second coolant groove 125 are adapted to provide coolant supply and coolant return paths. A second O-ring groove 126 is adapted to receive an O-ring for coolant and air sealing. An air groove 128 is adapted to provide a pressurized air supply to the turret head 70. A third O-ring groove 127 is adapted to receive an O-ring for air sealing. The manifold clamp and post 120 is provided with an air passage 131 and two coolant passages 132, as shown in FIG. 5. The air passage 131 is supplied with pressurized air. The coolant passages 132 provide coolant supply and coolant return paths. The air passage 131 feeds pressurized air to the air groove 128 of the manifold 121 through an air opening 134 within the air groove 128 of the manifold 121. The coolant passages 132 supply and receive return coolant via the coolant grooves 125, 126 of the manifold 121 through coolant openings 135 within the coolant grooves 125, 126 of the manifold 121. Coolant and air are transmitted from the manifold 121 to the turret head 70 through openings within the turret head 70.

Figure 6:
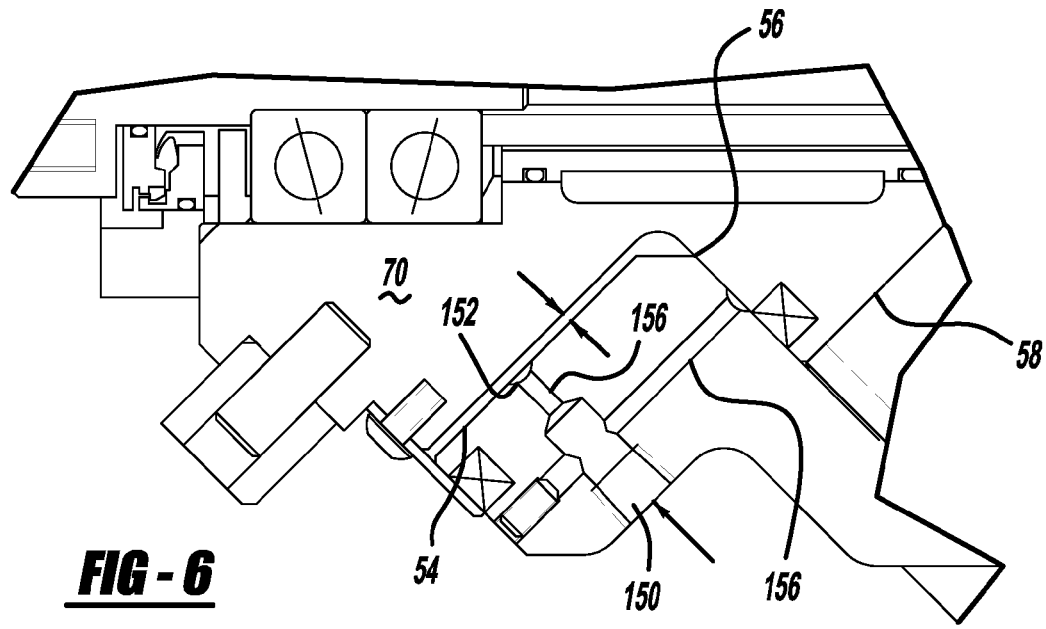
FIG. 6 is a broken away sectional view of the continuous tool rotation tool turret of FIG. 5, showing the tool turret unclamped from the slant surface of the housing.
Figure 7:
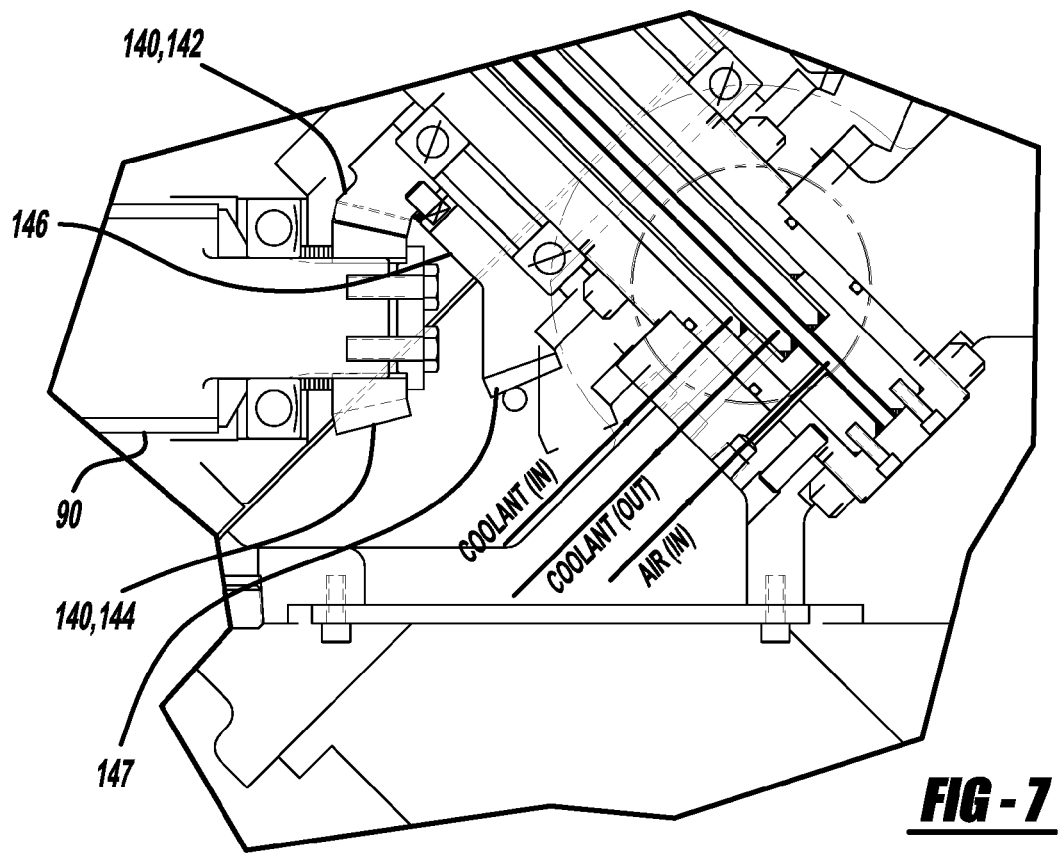
FIG. 7 is a broken away sectional view of the continuous tool rotation tool turret of FIG. 5, showing the bevel gear engagement of a spindle, as well as coolant and air passages within the post.
Figure 8:
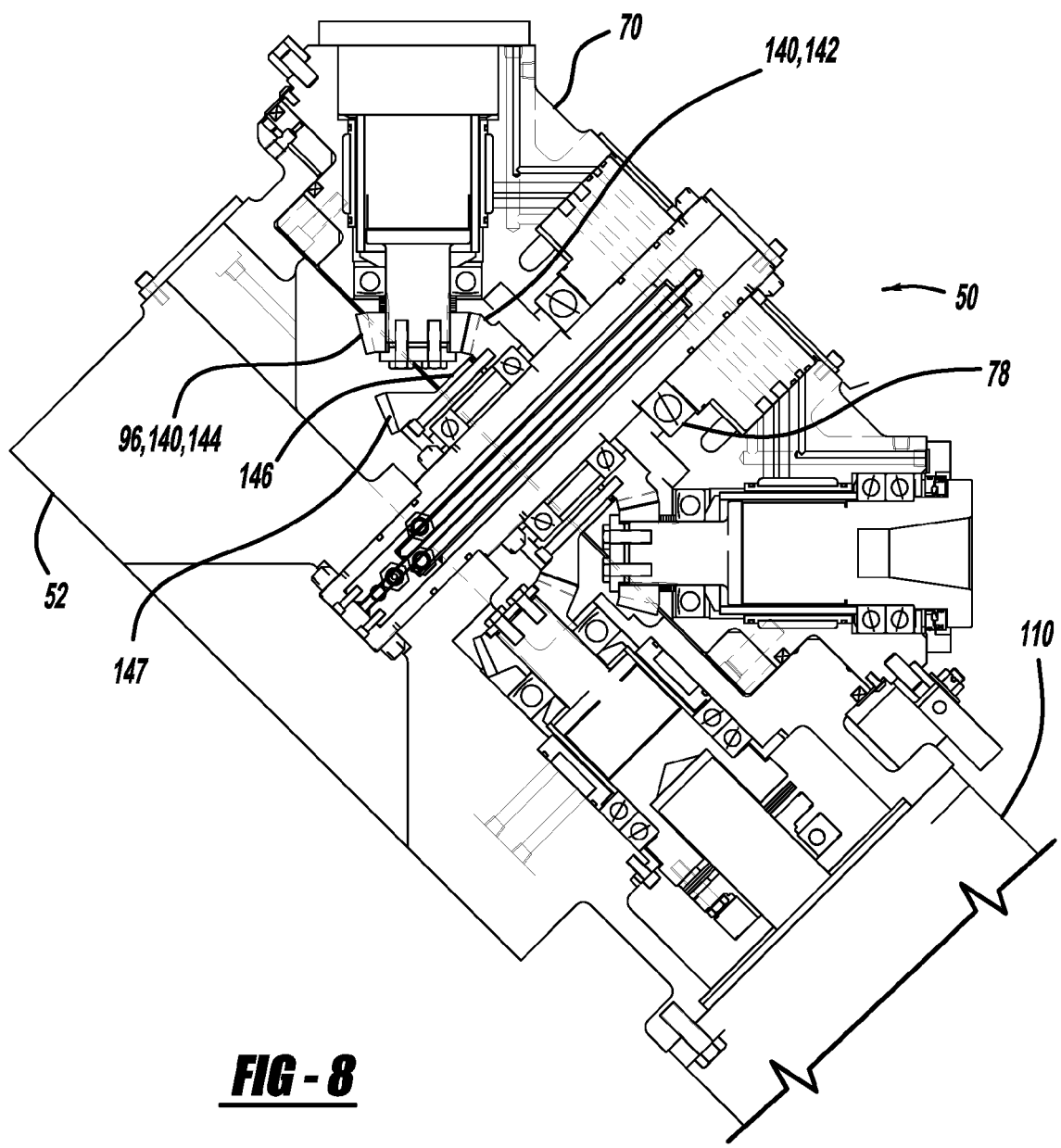
FIG. 8 is a sectional view of a continuous tool rotation tool turret.
Figure 9:
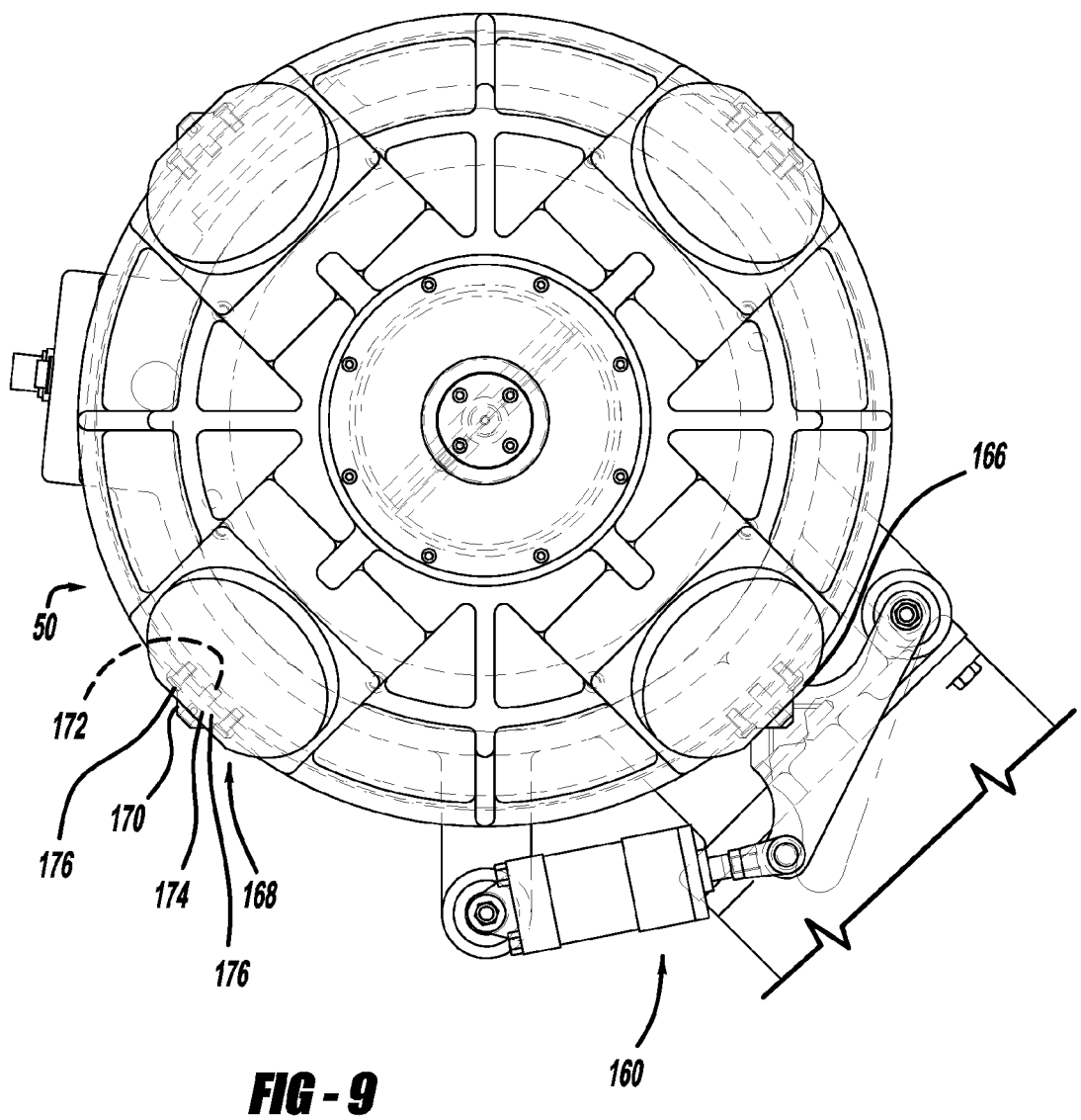
FIG. 9 is a top view of a continuous tool rotation tool turret employing an alternate embodiment of a wedge locator system.
Figure 10:
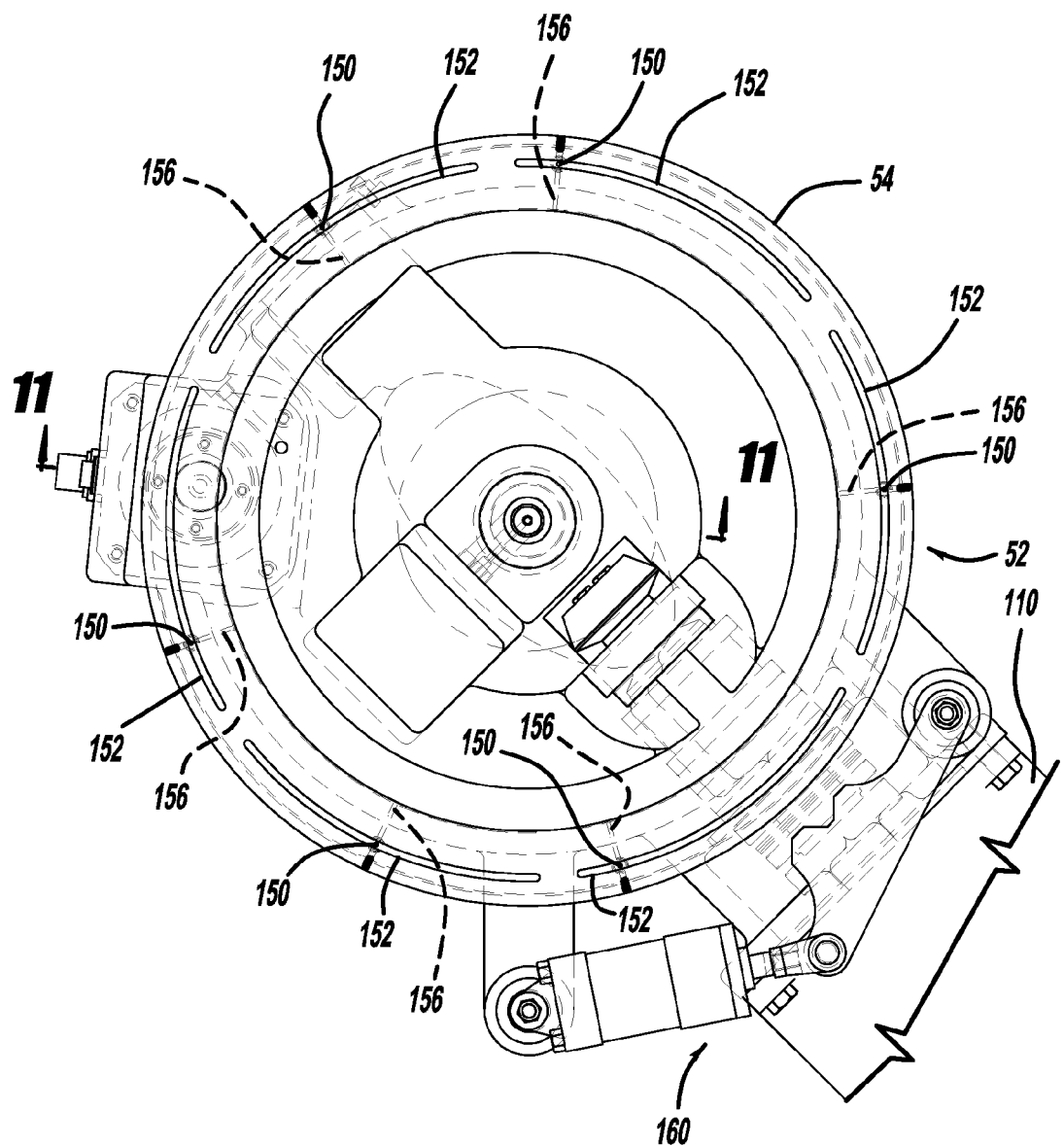
FIG. 10 is a top view of the slant surface of a continuous tool rotation tool turret housing showing segmented air grooves and the alternate embodiment of the wedge locator system of FIG. 9.

When it is desired to index the turret head 70, the turret head 70 is lifted from the slant surface 54 of the housing 52 by a cushion of pressurized air. In the preferred embodiment the slant surface 54 is ring shaped, as shown in FIG. 5 and FIG. 10. A central cavity within the housing 52 provides a cup shaped receptacle for rotatably supporting and positioning the turret head 70. A wall 56 located at the radial edge of the central cavity steps upward, as shown in FIG. 5 and FIG. 6, to form the side of the turret head 70 receptacle. The slant surface 54 is ring shaped and is located at the circumferential periphery of the housing 52. The bottom of the turret head 70 receptacle has a circular shape. A bottom central portion of the turret head 70 is shaped to rotatably fit within the cup shaped receptacle, while the bottom peripheral portion of the turret head 70 is shaped to mate with the ring shaped slant surface 54, as shown in FIG. 5 and FIG. 6.

Preferably, the surface of the ring shaped portion of the slant surface 54 is provided with a plurality of arc shaped first segmented air grooves 152. FIG. 10 shows the slant surface 54 with six segmented air grooves 152. Each segmented air groove 152 may receive pressurized air through an air feed 150. Each air feed 150 is adapted to provide pressurized air to a first segmented air groove 152 and a second segmented air groove 154 through an air channel 156. The second segmented air grooves 154 are circumferentially positioned along the wall 56 connecting the slant surface 54 to the bottom of the turret head 70 receptacle within the housing 52, as shown in FIG. 6. When pressurized air enters the air grooves 152, 154 it exerts a force normal to each pressurized groove 152, 154 opening. The force from the first segmented air grooves 152 tends to lift the turret head 70 from the slant surface 54. The force from the second segmented air grooves 154 tends to separate the turret head 70 from the wall 56 connecting the bottom of the turret head receptacle 58 within the housing 52 to the slant surface 54. The pressurized air emanating from the second segmented air grooves 154 also purges any contaminants entering the area between the wall 56 and the turret head 70. The air grooves 152, 154 are not required to be segmented. However, segmentation provides a better balancing of the lifting and separating forces provided by the pressurized air to the turret head 70. The use of segmented air grooves 152 also permits the use of a slant surface 54 and a mating surface on the turret head 70 which have flatness imperfections.

When it is desired to rotate or index the turret head 70, pressurized air is supplied to the air feeds 150. The pressurized air supplied to the first segmented air grooves 152 tends to lift the turret head 70 from the slant surface 54. The pressurized air supplied to the second segmented air grooves 154 tends to separate the turret head 70 from the turret head receptacle walls 56 and to purge the area of contaminants, as previously described. The optimal degree of lift between the turret head 70 and the slant surface 54 is about 0.0005 inches. For my initial prototype this degree of lift can be obtained within air pressure of about 70 psig. Once the turret head 70 is rotated into the desired position, the air pressure is removed and the turret head 70 becomes seated onto the slant surface 54. Appropriate air bleeds may be employed to ensure complete seating of the turret head 70 to the slant surface 54.

Figure 14:
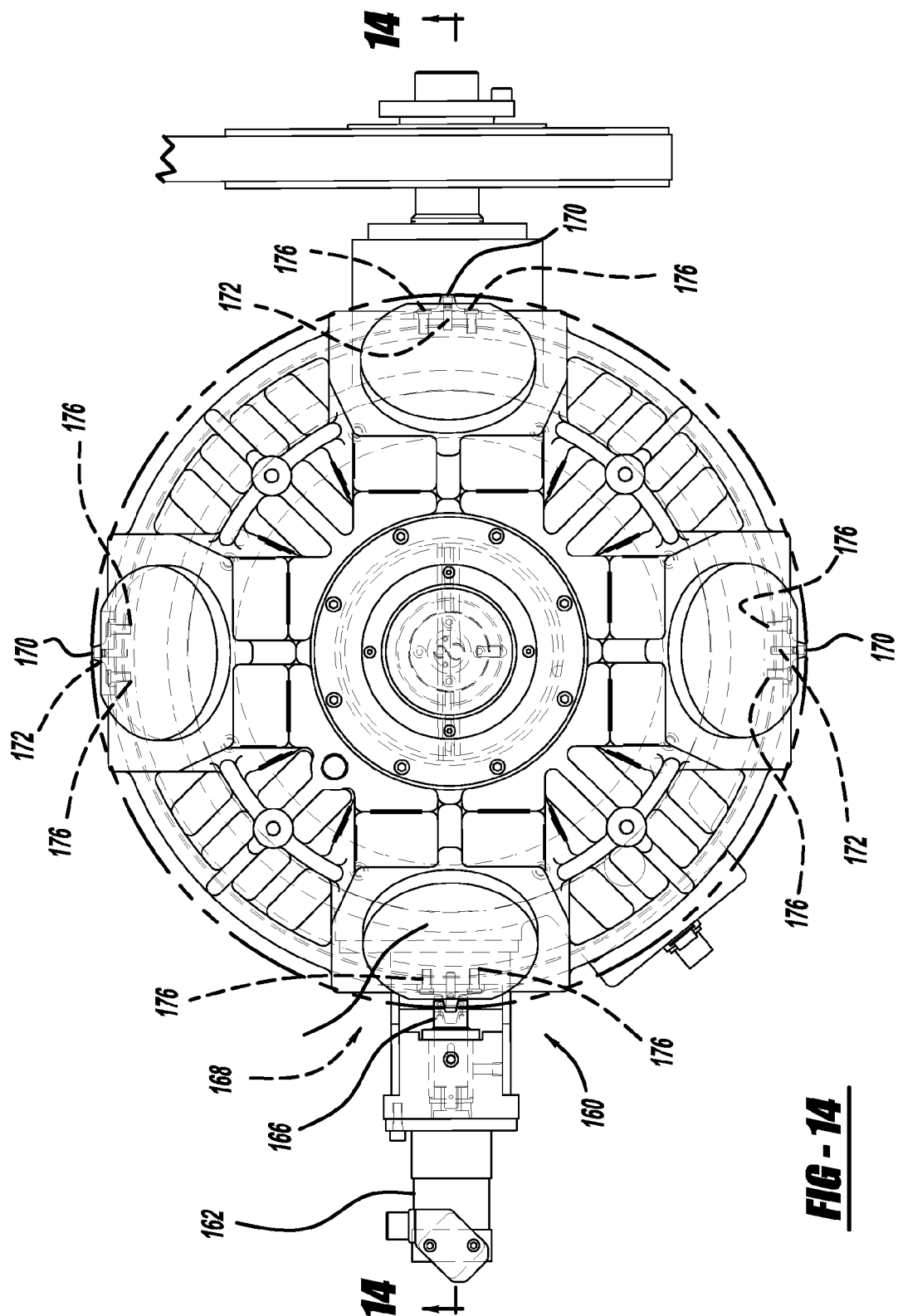
FIG. 14 is a top view of a turret head and a wedge locator system, showing a spindle motor operationally connected to a post gear through a belt driven pulling.
Figure 15:
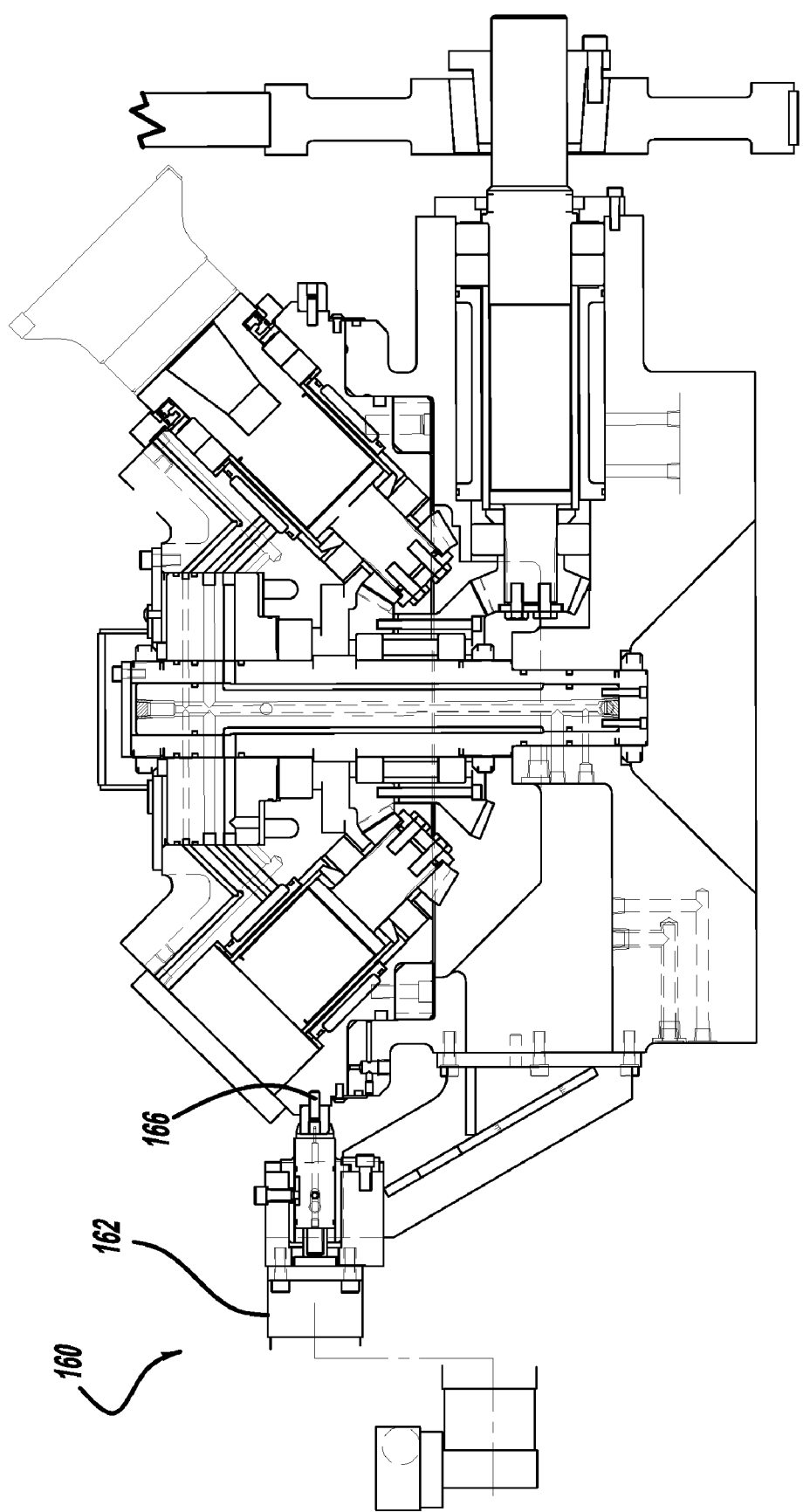
FIG. 15 is a side elevation sectional view of the wedge locator system of FIG. 14 and of the turret head and housing of FIG. 14.

The combination of the turret head 70 airlift system and the turret head indexing system (comprised of the servo motor 80, the ring gear 82 and the pinion gear 84) positions the turret head 70 and operational spindle assembly 90 with sufficient accuracy for many machining operations. Additional accuracy of the positioning of the turret head 70 for an impending machining operation may be obtained with the use of a wedge locator system 160 attached to the housing 52 and the turret head 70. The wedge locator system 160 is shown in FIGS. 14-15 and 26-29. The wedge locator system 160 is comprised of an air cylinder 162, an air cylinder bracket 164, a wedge locator 166 and a plurality of wedge assemblies 168. Each wedge assembly 168 is comprised of a wedge 170 and an alignment dowel 172. An air cylinder 162 is attached to the housing 52 by way of an air cylinder bracket 164. The air cylinder 162 and air cylinder bracket 164 are positioned proximal to a spindle assembly 90 which is not about to perform a machining operation, as shown in FIG. 14. The air cylinder 162 contains a wedge locator 166. The wedge locator 166 moves along the longitudinal axis of the air cylinder 162 in response to pressurized air being supplied to the air cylinder 162. When the air cylinder 162 is not supplied with pressurized air, the wedge locator 166 is in a retracted position and does not interfere with rotation of the turret head 70. When the air cylinder 162 is supplied with pressurized air, the wedge locator 166 extends into an extended position and mates with a wedge 170 which is fixed to the turret head 70. The turret head 70 contains a plurality of wedges 170. When the wedge locator 166 mates with a wedge 170 the wedge locator system 160 does not interfere with a machining operation to be performed by a cutting tool 98 within a spindle assembly 90 which is in an operational position. Each wedge assembly 168 is comprised of a wedge 170 and an alignment dowel 172. The turret head 70 contains dowel alignment holes within which the dowel 172 of a wedge assembly 168 is seated. Each wedge 170 is attached to a the turret head 70. Each wedge 170 contains an alignment dowel 172 and bolt openings. The turret head 70 dowel alignment holes are positioned such that they will facilitate accurate positioning of the turret head 70 prior to the beginning of a machining operation. The wedge assemblies 168 are attached to the turret head 70 with bolts 176 while their respective alignment dowels 172 are positioned within the dowel openings of the turret head 70. Each wedge 170 is in the shape of a wedge. Each wedge locator 166 is in the shape of an opening adapted to receive a wedge 170. Thus, when a wedge locator 166 extends onto a mating wedge 170 the longitudinal axis of the wedge locator 166 and the longitudinal axis of the wedge 170 align. This provides an additional degree of accuracy when positioning the turret head 70 with respect to a workpiece prior to the beginning of a machining operation upon the workpiece. The wedge locator system 160 is used while the turret head 70 is separated from the slant surface 54 of the housing 52 by pressurized air. The preferred angle between the faces of each wedge 170, as well as the faces of the wedge locator 166, is approximately 30°.

The use of pressurized air to lift the turret head 70 has several advantages compared to prior art rotatable turret heads which do not use an airlift. The friction between the turret head 70 and the slant surface 54 is significantly reduced. Therefore, the turret head 70 and the slant surface 54 are subjected to less wear for a given number of rotations. This reduces the need for repair, replacement and maintenance to the turret head 70 and the housing 52. Since the turret head 70 rests upon the slant surface 54, rather than upon bearings, a more precise and repeatable positioning of the turret head 70 is obtained. Bearing wear is not a factor in the precision and accuracy of the turret head 70 positioning. The minimized friction between the turret head 70 and the slant surface 54 also facilitates a quicker movement of the turret head 70 from one indexed positioned to another.

The spindle housings 72 each contain a spindle assembly 90. Each spindle assembly 90 is comprised of a spindle 92, a tool holder 94 and an input gear 96. The tool holder 94 is attached to one end of the spindle 92. It is adapted to securely hold a tool 98. The input gear 96 is attached to the other end of the spindle 92. A motor 110 rotatably drives the spindle 92. The motor 110 simultaneously drives all of the spindles 92 through a post gear 146. This is to be distinguished from the prior art wherein typically the motor drives only one spindle at a time through a clutch and wherein rotation of the spindles ceases and the clutch is disengaged before indexing or rotation of the turret. The spindle motor 110 may directly drive the post gear 146. Alternatively, the spindle motor may indirectly drive the post gear 146 through a belt driven pulley, as shown in FIG. 14.

Figure 12:
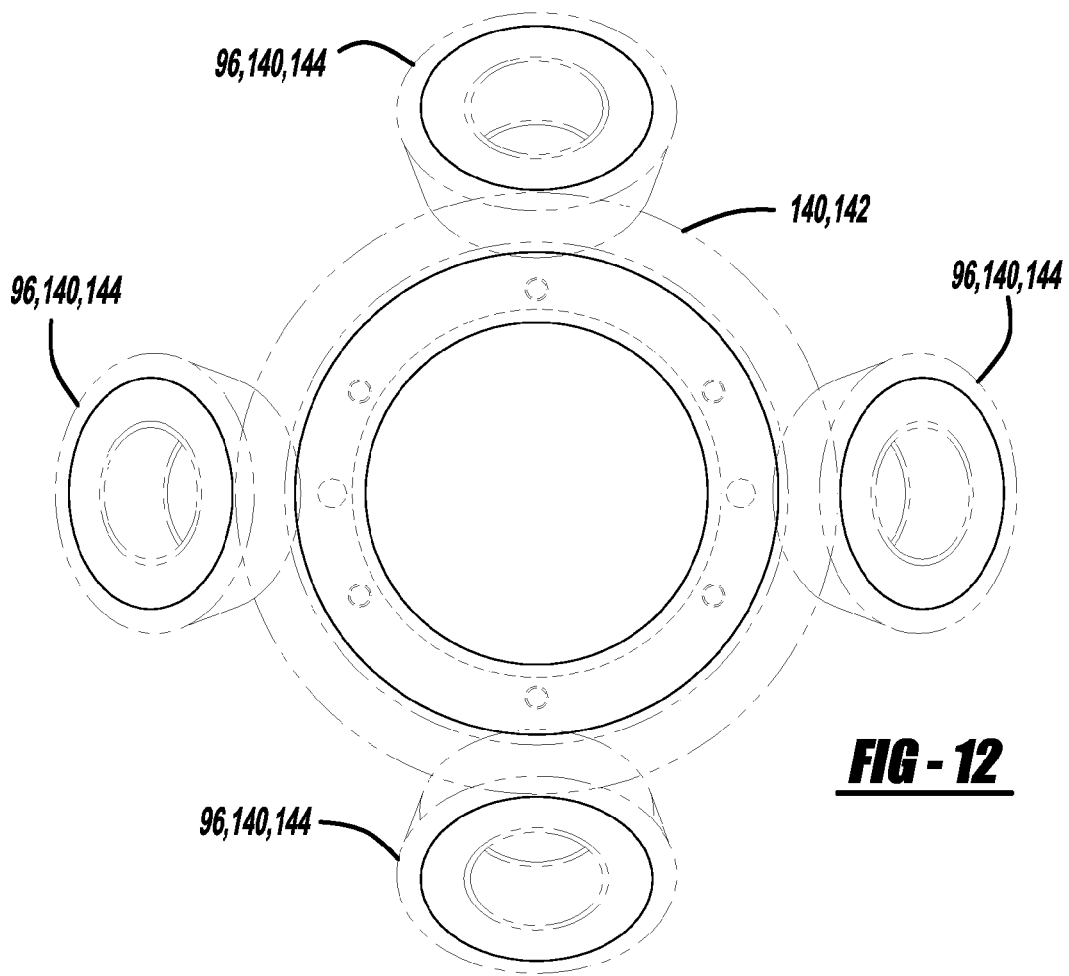
FIG. 12 is a perspective view of a drive bevel gear shown in engagement with four driven bevel gears from a plurality of spindle assemblies.
Figure 13:
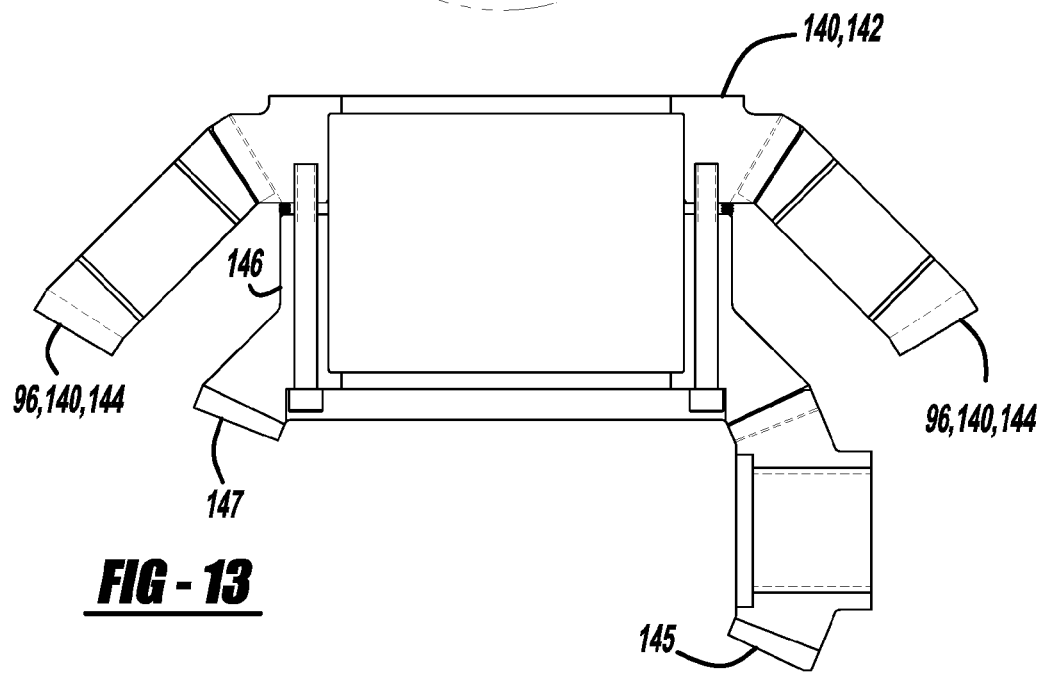
FIG. 13 is a side elevation sectional view of a post gear attached to a drive bevel gear wherein the post gear is rotatable about a post and the drive bevel gear is shown in engagement with two driven bevel gears of two spindles.

Figures and 12-13 depict the method for obtaining continuous tool rotation. Continuous tool rotation is obtained by driving the spindles 92 with bevel gears 140. The reference number 140 is used herein to generally designate all bevel gears. Additional reference numbers such as 142, 144, 145 and 147 are used to designate particular types of bevel gears. A post gear 146 is adapted to rotate around the lower end of the manifold post 120. The post gear 146 is shown in FIG. 13. Bearings facilitate rotation of the post gear 146 around the manifold post 120. The post gear 146 has an upper end and a lower end. A lower end driven post gear 147 extends from the lower end of the post gear 146. The lower end driven post gear 147 is a bevel gear which extends from the lower end of the post gear 146. The lower end driven post gear 147 meshes with a motor driver gear 145. The motor driver gear 145 is a bevel gear. It is attached to the output shaft of the spindle motor 110. Alternatively, the motor driver gear 145 is attached to the output shaft of a pulley driven by the spindle motor 110. When the output shaft of the spindle motor 110 rotates the motor driver gear 145 rotates the post gear 146 by transmitting a rotational force to the lower end driven post gear 147. The upper end of the post gear 146 is provided with a drive bevel gear 142. In Figure the 13 the upper end of the post gear 146 is actually a separate bevel gear which is made integral with the remainder of the post gear 146 by being physically attached to it with bolts, as shown in the figure. The drive bevel gear 142 meshes with each of the spindle driven bevel gears 96, 144. Thus, rotation of the motor driver gear 145 causes simultaneous rotation of each spindle driven bevel gear 96, 144. As can be seen from FIG. 12, the spindle driven bevel gears 96, 144 may simultaneously rotate irrespective of whether the turret head 70 is stationary or rotating.

Because the drive bevel gear 142 meshes with each driven bevel gear 96, 144 contained within the spindle assemblies 90 of the turret head 70 continuous tool rotation is obtained. The tools 98 continue to rotate when the turret head 70 is indexed or rotated. Therefore, time is not lost due to the starting and stopping of tool rotation and due to engaging and disengaging a clutch between the turret head 70 indexings. The production rate for finished workpieces is increased because the machining operations performed upon the workpieces occur at a faster rate.

The preferred angle between the axis of rotation of each spindle 92 and the longitudinal axis of the manifold and clamp post 120 is 45°. This permits one spindle assembly 90 to be in a work position while the remaining spindle assemblies 90 avoid interference with the workpiece. Each spindle assembly 90 is mounted within a spindle housing 72 of the turret head 70. Bearings 100 permit the spindle 92 to rotate within the spindle housing 72.

Figure 16:
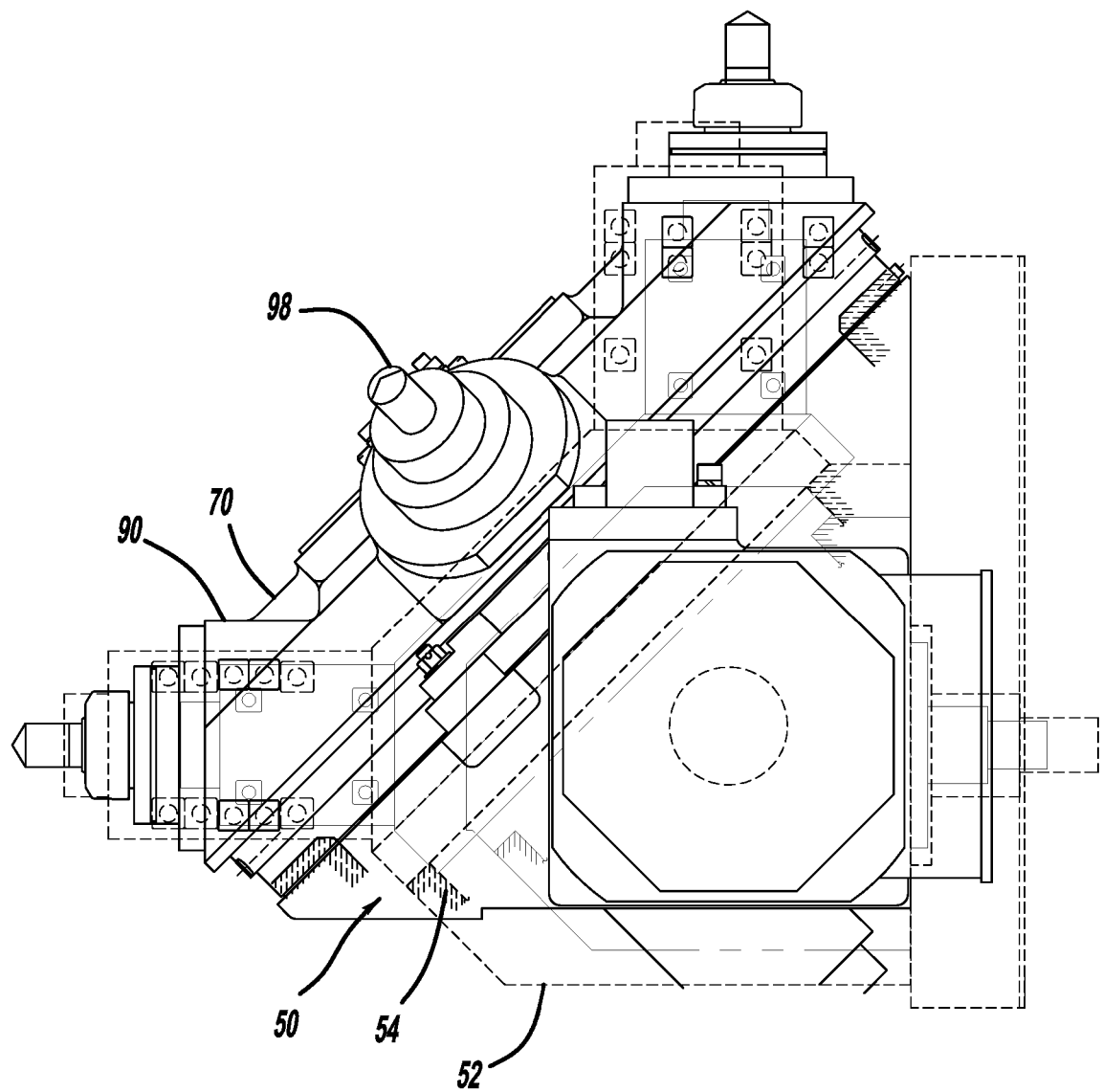
FIG. 16 is a side view of a prior art tool turret and slant surface overlaid upon a side view of a continuous tool rotation tool turret and its slant surface.
Figure 17:
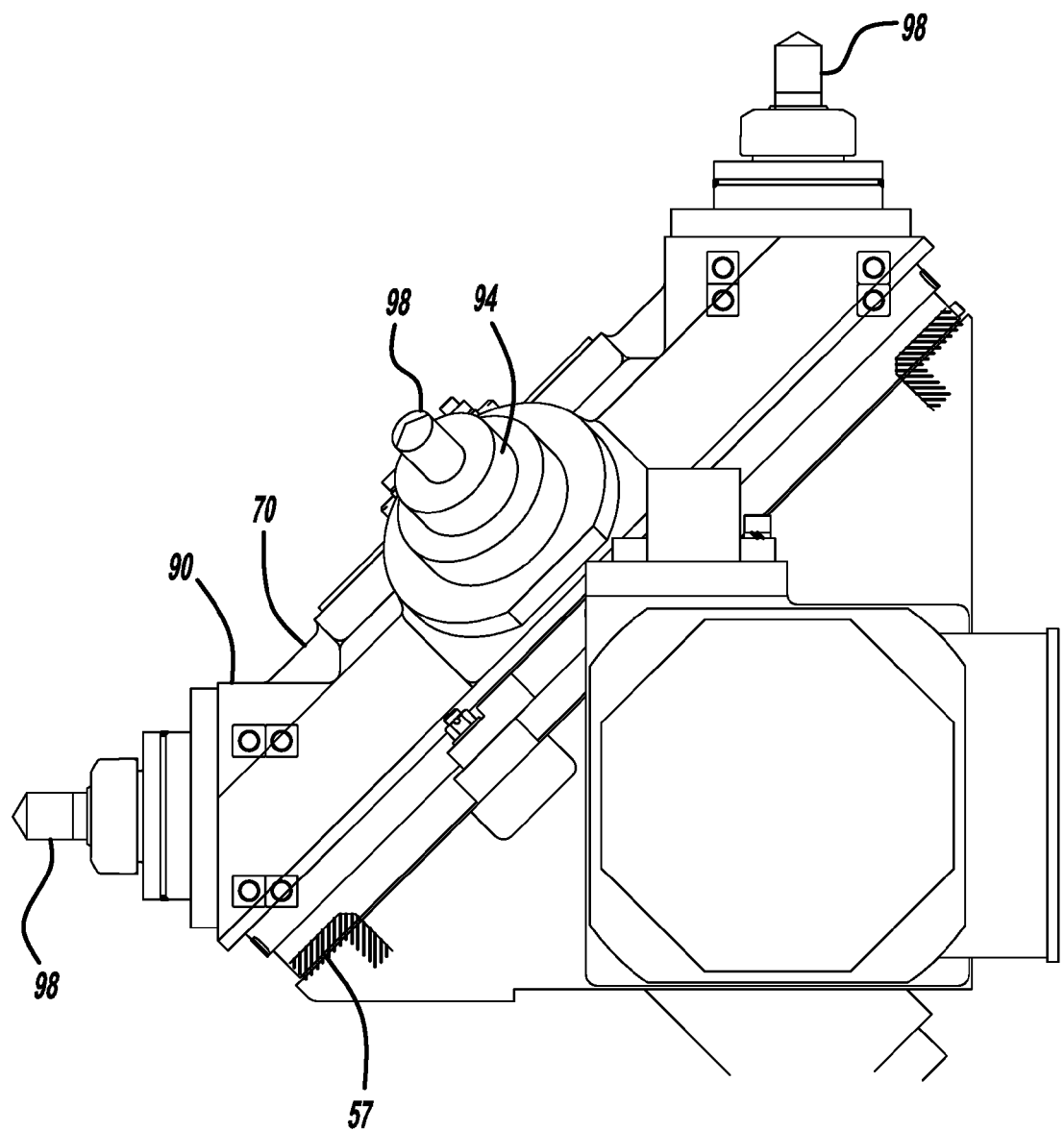
FIG. 17 is a side view of a continuous tool rotation tool turret wherein the tool turret is raised slightly above its respective slant surface.
Figure 18:
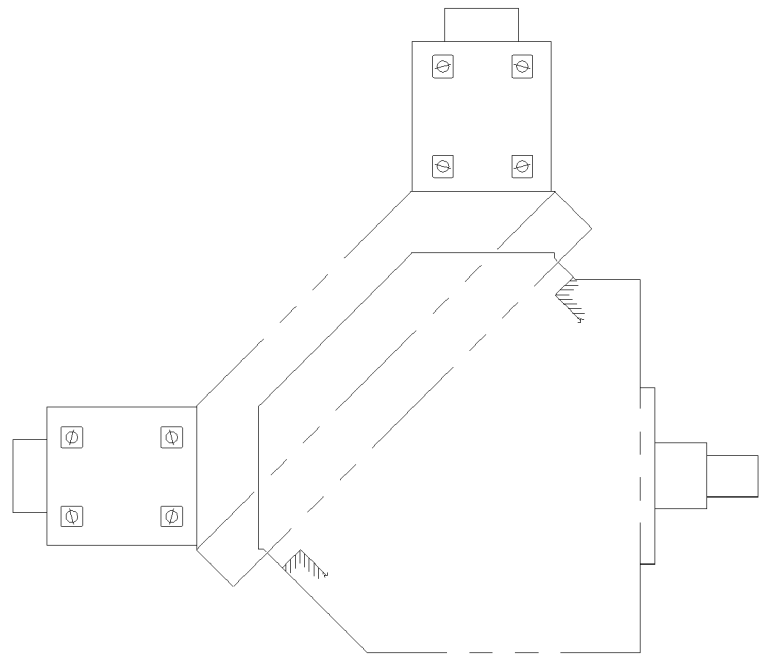
FIG. 18 is a side elevation view of a prior art tool turret including a housing.
Figure 19:
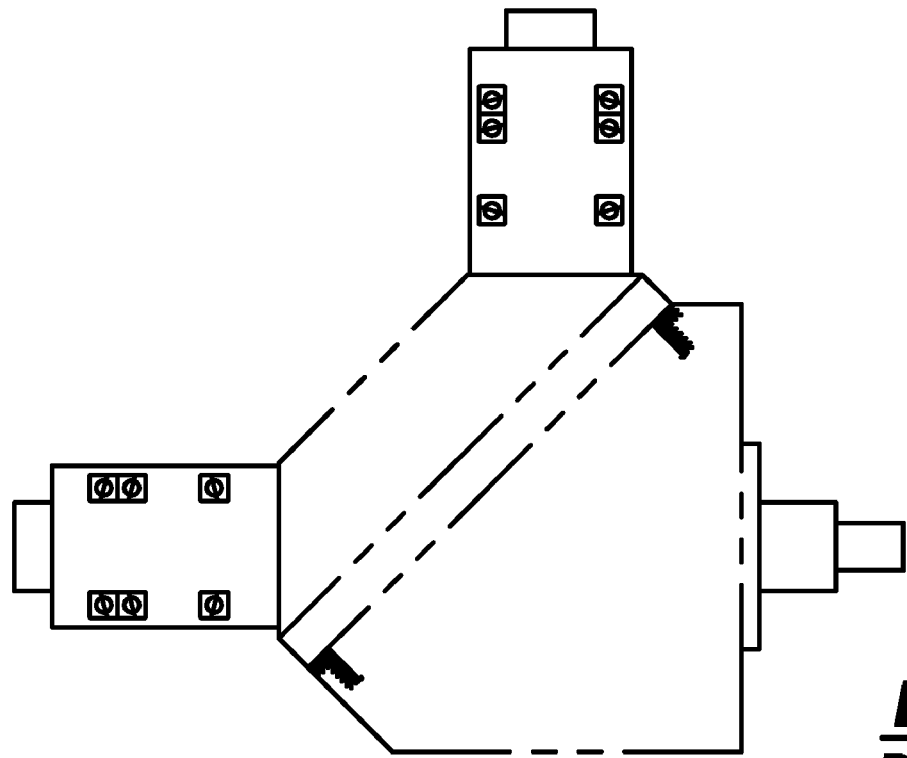
FIG. 19 is a side elevation view of a prior art tool turret including a housing.
Figure 20:
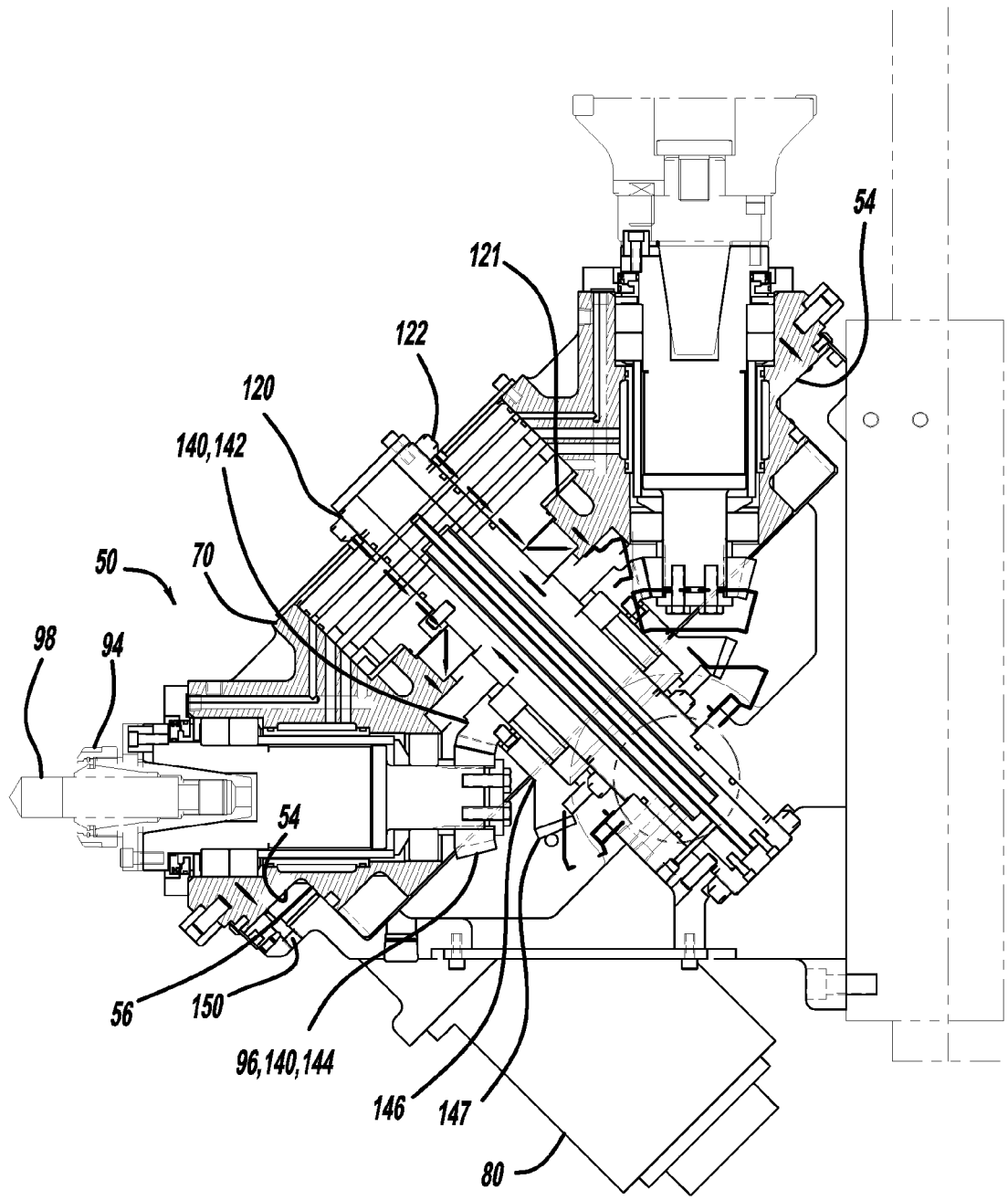
FIG. 20 is a side elevation sectional view of a continuous tool rotation tool turret wherein the turret head is hatched to distinguish the turret head from the manifold and the post.

Prior art turrets typically use separate bolt on spindle assemblies. In the preferred embodiment of this invention the spindle assemblies 90 are fit within a spindle housing 72 which is integral with the turret head 70. This invention also encompasses embodiments which use separate bolt on spindle assemblies. The distances between the end of the work tool and the housing rest surface of prior art turrets is larger than the distance between the end of the work tool 98 and the slant rest surface 54 of the device described herein. This can be seen from FIGS. 16, 18 and 19. FIG. 16 shows a prior art turret overlaid upon a drawing showing the turret discussed herein. This invention permits the use of higher tool thrust forces with larger bearings than the prior art devices.

A coolant jacket 74 is embedded within the turret head 70 and surrounds each spindle assembly 90, as shown in FIG. 5. A cooling system is provided which circulates a liquid coolant through the cooling jackets 74. While the spindles 92 are rotating and especially while the tools 98 are performing a machining operation a high degree of heat is produced at the spindle assemblies 90. The coolant carries this heat away from the spindle assemblies 90 and the turret head 70. Therefore, the spindle assemblies 90 operate at a lower temperature compared to what the temperature would be if there were no circulating coolant. The spindles can be rotated at a higher speed because of the reduced temperatures caused by the coolant. Additionally, the reduced spindle assembly 90 temperatures increase the life expectancy of the spindle assemblies 90 and increase the time between required spindle assembly 90 maintenance operations.

Figure 2:
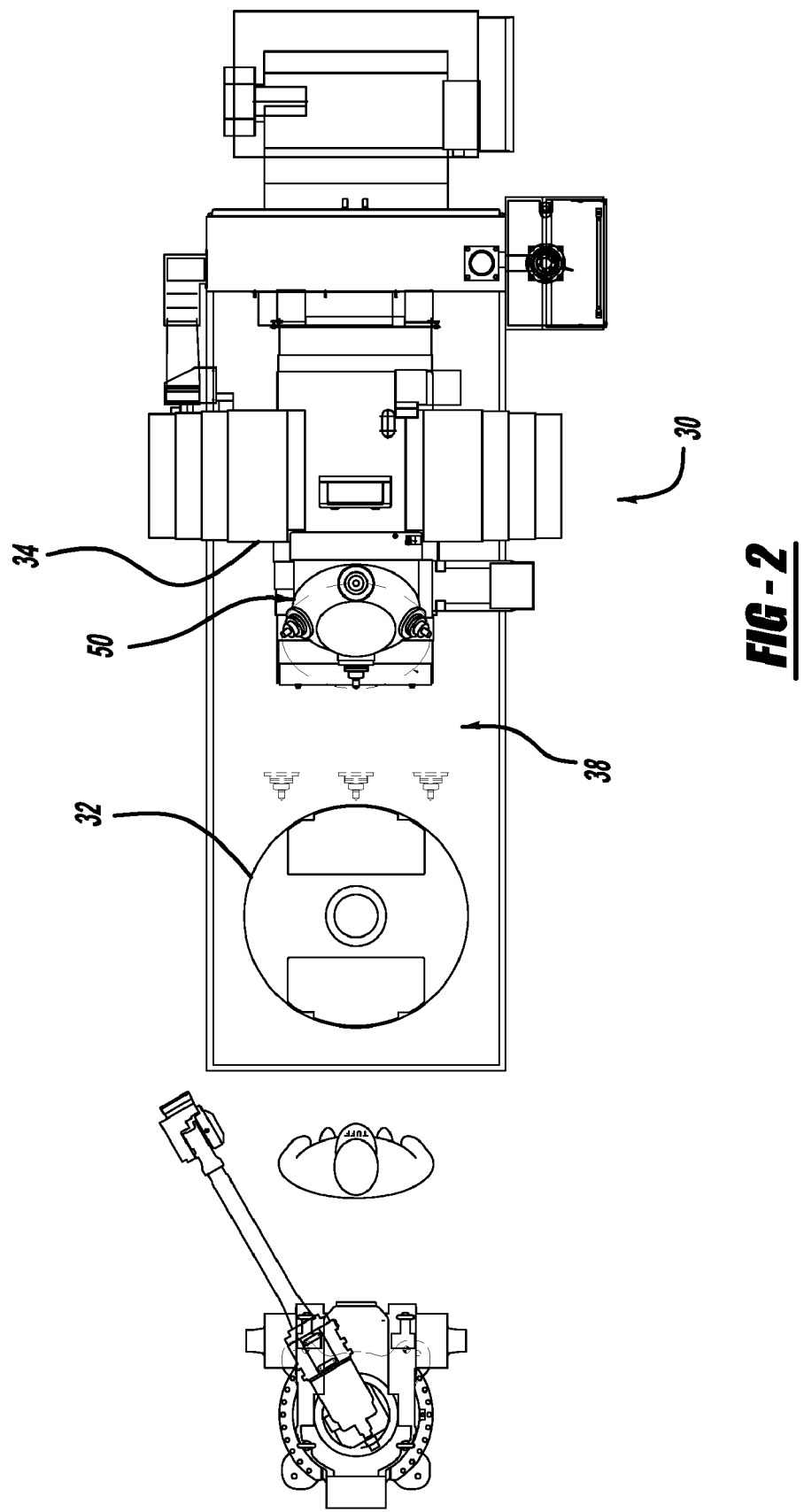
FIG. 2 is a top view of an automated machine tool using a continuation tool rotation tool turret.
Figure 3:
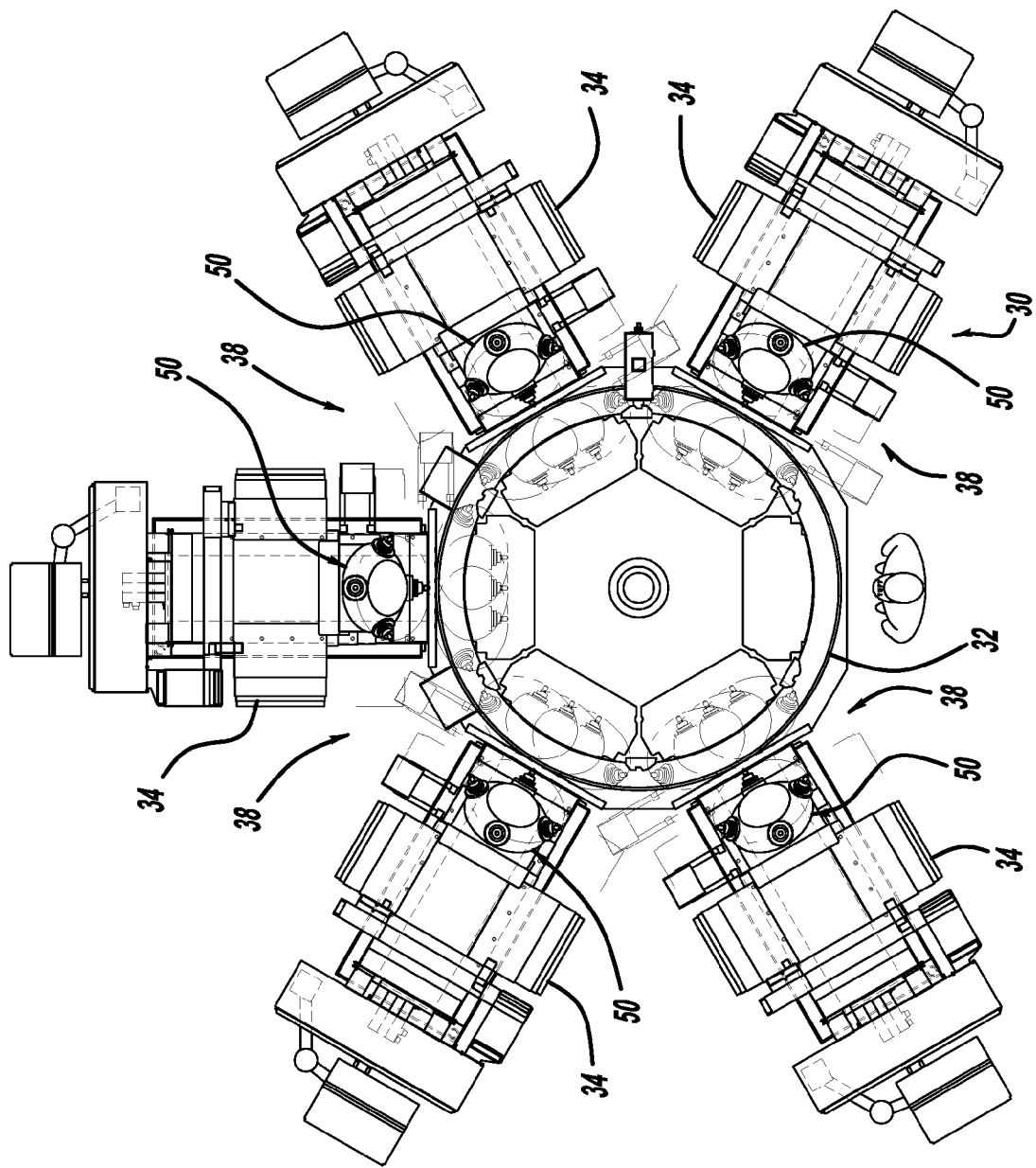
FIG. 3 is a top view of an automated machine tool having five workstations which use continuous tool rotation tool turrets.
Figure 4:
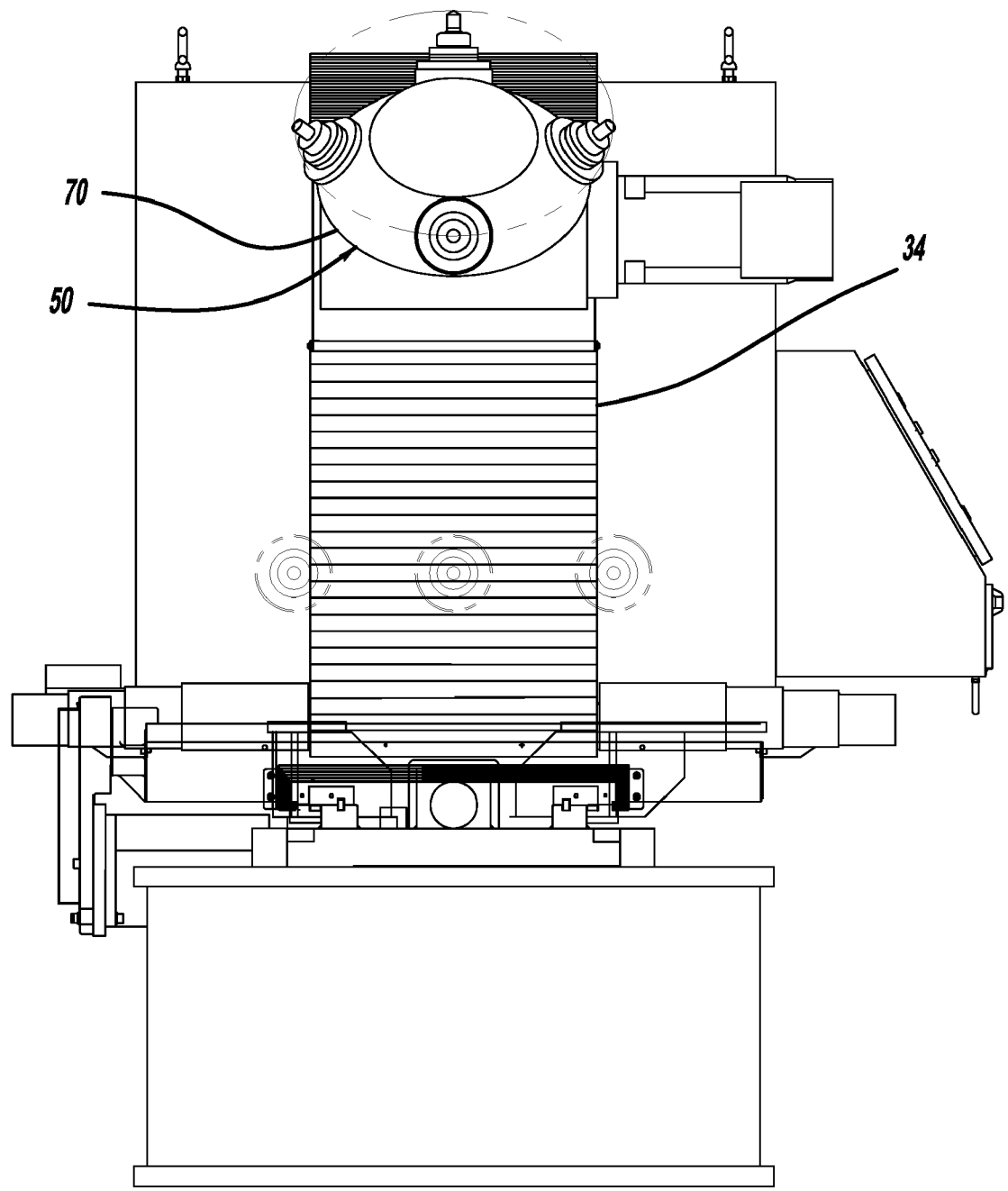
FIG. 4 is a front elevation view of a three axis CNC slide having a continuous tool rotation tool turret attached to it and which is typical of a single workstation of the automated machine tool of FIG. 3.

The preferred use of a continuous tool rotation tool turret 50 is in conjunction with an index table 32 and one or more three axis CNC slides 34. However, the continuous tool rotation tool turret 50 can be used without an index table 32 or a three axis CNC slide 34. Two typical work set ups are shown in FIGS. 1-3. FIG. 1 and FIG. 2 show an index table 32 with a single workstation 38 and two workpiece fixtures. The continuous tool rotation tool turret 50 is shown mounted to a three axis CNC slide 34. The three axis CNC slide 34 is aligned with the index table 32 such that machining operations may be performed upon a workpiece attached to a workpiece fixture of the index table 32. FIG. 3 shows a similar set up with five workstations 38. A program module 36 controls the position of the index table 32, the three axis CNC slide 34 and the spindle assemblies 90 (i.e. rotational/index position of the turret head 70). In each set up the program module 36 is appropriately programmed. The program determines the timing and position of the workpiece. It also controls the speed of the cutting tools 98, the position of the spindle assemblies 90 with respect to the housing 52 and the position of the spindle assemblies 90 with respect to the workpiece. The index table 32 is programmed (by way of the program module 36) to position a workpiece in a work position.

In order to perform a machining operation a workpiece is brought into position for machining. Prior to machining all of the cutting tools 98 on the turret head are brought to an operational speed. The turret head 70 indexes (or rotates) one of the spindle assemblies 90 into an operational position. In response to programming, the operational spindle 92 and cutting tool 98 perform a machining operation, such as drilling, milling, reaming, tapping or boring, upon the workpiece. After the machining operation is completed, the turret head 70 is backed away from the workpiece. The spindles 92 continue to rotate at an operational speed. Pressurized air is supplied to the air feeds 150. This unclamps the turret head 70 from the slant surface 54 of the housing 52. Ideally, the turret head 70 is separated from the slant surface 54 by a cushion of air. The turret head 70 is then rotated or indexed such that the next desired spindle assembly 90 and cutting tool 98 are brought into a work position. If the continuous tool rotation tool turret 50 is equipped with a wedge locator system 160, the air cylinder 162 is activated. This causes the wedge locator 166 to mate with a wedge 170 attached to the turret head 70. The mating of the wedge locator 166 with the wedge 170 facilitates more precise positioning of the operational cutting tool 98 with respect to the housing 52 and, more importantly, the workpiece. After the spindle assembly 90 is accurately positioned with respect to the housing 52 and the workpiece, air pressure is removed from the air feeds 150. As a result, the turret head 70 becomes clamped into the proper desired position. At all times during the machining process the spindles 92 continuously rotate. This continuous rotation of the spindles 90 permits the turret head 70 to be indexed from position to position much quicker, and with much less wear on the moving parts, as compared to prior art tool turrets.

Although the invention has been shown and described with reference to certain preferred embodiments, those skilled in the art undoubtedly will find alternative embodiments obvious after reading this disclosure. With this in mind, the following claims are intended to define the scope of protection to be afforded the inventor, and those claims shall be deemed to include equivalent constructions insofar as they do not depart from the spirit and scope of the present invention.

What is claimed is:

1. A continuous tool rotation tool turret comprising: (a) a turret head having an axis of rotation about which the turret head rotates; (b) a plurality of spindles attached to the turret head, each said spindle being adapted to secure and rotate a cutting tool; (c) a motor adapted to simultaneously rotate each spindle; (d) wherein the spindles are adapted to rotate at an operational speed while the turret head is being indexed; (e) wherein the spindles are sized, positioned and angled with respect to the axis of rotation of the turret head and the turret head such that only one spindle may be in a work position at a time; (f) wherein said motor is operationally connected to the spindles to simultaneously rotate the spindles; (g) a housing providing a slant surface upon which the turret head may rotatably rest and a receptacle within which a portion of the turret head may be rotatably seated; (h) a post attached to the housing such that the post is perpendicularly oriented with respect to the slant surface; (i) wherein said turret head rotatably rests upon the slant surface and partially within the receptacle of the housing such that said turret head has an axis of rotation about which it rotates for indexing on the slant surface; (j) wherein a fastener attached to the post clamps the turret head to the slant surface; and (k) said slant surface of the housing having one or more air grooves wherein each of the one or more slant surface air grooves are connectable to a pressurized air source and are open at the surface of the slant surface for providing a force which tends to unclamp the turret head from the slant surface of the housing.

2. The continuous tool rotation tool turret of claim 1, wherein the angle between the axis of rotation of each spindle and the axis of rotation of the turret head is about 45°.

3. The continuous tool rotation tool turret of claim 1, further comprising: (a) a drive bevel gear adapted to rotate about the axis of the post; (b) wherein an input gear of each spindle is a driven bevel gear; (c) wherein the motor is operationally connected to said drive bevel gear for rotating said drive bevel gear about the axis of the post; and (d) wherein said drive bevel gear is engaged with each of said input driven bevel gears for providing simultaneous rotation of all spindles, said spindles and gears being adapted such that the spindles rotate at an operational speed while the turret head is being indexed.

4. The continuous tool rotation tool turret of claim 1, further comprising: (a) a manifold; (b) wherein said post has a supply coolant passage connected at one end to the manifold and at the other end to a coolant inlet for supplying coolant to the manifold, a return coolant passage connected at one end to the manifold and at the other end to a coolant outlet for receiving coolant from the manifold and an air passage connected at one end to the manifold and at the other end to an air inlet for supplying pressurized air to the manifold; (c) said manifold being attached to the post and having a plurality of annular grooves along its periphery, a first groove being connected to the supply coolant passage of the post and being adapted to supply coolant to the turret head, a second groove being connected to the return coolant passage of the post and being adapted to return coolant from the turret head, a third groove being connected to the air passage of the post and being adapted to supply pressurized air to the turret head, said manifold being shaped to permit rotation of the turret head about the periphery of the manifold; and (d) wherein said turret head is adapted to receive supply coolant from the manifold, to receive pressurized air from the manifold and to return coolant to the manifold.

5. The continuous tool rotation tool turret of claim 1, further comprising: (a) a plurality of first wedge locator members attached to the turret head; (b) an actuator adapted for extension and retraction of a wedge locator member; (c) a second wedge locator member attached to the actuator; (d) said first wedge locator members and said second wedge locator member being shaped to fit together as a wedge and a wedge receptacle; (e) said actuator being fixedly positioned with respect to the turret head; (f) the position of the actuator with respect to the turret head, the position of each first wedge locator member upon the turret head and the position of the second wedge locator member with respect to the actuator being set such that a preselected indexed position of the turret head results from the engagement of the second wedge locator member with a first wedge locator member.

6. A continuous tool rotation tool turret which indexes on a slant surface, said tool turret comprising:
(a) a turret head;
(b) a housing providing a slant surface upon which the turret head may rotatably rest and a receptacle within which a portion of the turret head may be rotatably seated;
(c) a manifold;

(d) a manifold and clamp post attached to the housing such that the post is perpendicularly oriented with respect to the slant surface, said post having a supply coolant passage connected at one end to the manifold and at the other end to a coolant inlet for supplying coolant to the manifold, a return coolant passage connected at one end to the manifold and at the other end to a coolant outlet for receiving coolant from the manifold and an air passage connected at one end to the manifold and at the other end to an air inlet for supplying pressurized air to the manifold, wherein the manifold end of the post is adapted to receive a fastener for clamping the turret head to the slant surface;

(e) said manifold being attached to the post and having a plurality of annular grooves along its periphery, a first groove being connected to the supply coolant passage of the post and being adapted to supply coolant to the turret head, a second groove being connected to the return coolant passage of the post and being adapted to return coolant from the turret head, a third groove being connected to the air passage of the post and being adapted to supply pressurized air to the turret head, said manifold being shaped to permit rotation of the turret head about the periphery of the manifold;

(f) wherein said turret head rotatably rests upon the slant surface of the housing such that said turret head has an axis of rotation about which it rotates for indexing on the slant surface;

(g) wherein said turret head is clamped to the slant surface by a fastener engaged with the manifold end of the post;

(h) wherein said turret head is adapted to receive supply coolant from the manifold, to receive pressurized air from the manifold and to return return coolant to the manifold;

(i) said slant surface of the housing having one or more air grooves wherein each of the one or more slant surface air grooves are connectable to a pressurized air source and are open at the surface of the slant surface for providing a force which tends to unclamp the turret head from the slant surface of the housing;

(j) a plurality of spindle assemblies attached to the turret head, each said spindle assembly comprising:
　(i) a spindle housing;
　(ii) a spindle;
　(iii) a tool holder attached to the spindle, said toolholder being adapted to secure a tool; and
　(iv) an input driven bevel gear attached to the spindle for rotatably driving the spindle;
　(v) wherein each said spindle assembly is adapted to secure and rotate a cutting tool;

(k) wherein each said spindle housing has a cooling jacket adapted to receive supply coolant from the manifold and to return return coolant to the manifold for cooling the spindle assembly;

(l) a drive bevel gear adapted to rotate about the axis of the post;

(m) a motor operationally connected to said drive bevel gear for rotating said drive bevel gear about the axis of the post;

(n) wherein said drive bevel gear is engaged with each of said input driven bevel gears for providing simultaneous rotation of all spindles, said spindles and gears being adapted such that the spindles rotate at an operational speed while the turret head is being indexed;

(o) wherein each said spindle has an axis of rotation about which a tool secured to the spindle rotates;

(p) wherein the angle between the axis of rotation of each spindle and the axis of rotation of the turret head is less than 90°;

(q) and wherein the spindles are sized, positioned and angled with respect to the axis of rotation of the turret head and the turret head such that only one spindle may be in a work position at a time.

7. The continuous tool rotation tool turret which indexes on a slant surface of claim 6, further comprising:
(a) a plurality of first wedge locator members attached to the turret head;
(b) an actuator adapted for extension and retraction of a wedge locator member;
(c) a second wedge locator member attached to the actuator;
(d) said first wedge locator members and said second wedge locator member being shaped to fit together as a wedge and a wedge receptacle;
(e) said actuator being fixedly positioned with respect to the turret head;
(f) the position of the actuator with respect to the turret head, the position of each first wedge locator member upon the turret head and the position of the second wedge locator member with respect to the actuator being set such that a preselected indexed position of the turret head results from the engagement of the second wedge locator member with a first wedge locator member.

8. The continuous tool rotation tool turret of claim 6, wherein the angle between the axis of rotation of each spindle and the axis of rotation of the turret head is about 45°.

* * * * *